(12) United States Patent
Rognin et al.

(10) Patent No.: US 12,529,645 B2
(45) Date of Patent: Jan. 20, 2026

(54) SYSTEMS AND METHODS FOR AUTOFOCUS AND AUTOMATED CELL COUNT USING ARTIFICIAL INTELLIGENCE

(71) Applicants: LIFE TECHNOLOGIES CORPORATION, Carlsbad, CA (US); CELLOMICS, INC., Carlsbad, CA (US)

(72) Inventors: Nicolas Rognin, Bothell, WA (US); Larry Rystrom, Mill Creek, CA (US); Ognjen Golub, Eugene, OR (US); Jonathan Paullin, Kirkland, WA (US); Nicholas Diliani, Mountlake Terrace, WA (US); Kim Ippolito, South Park, PA (US)

(73) Assignees: LIFE TECHNOLOGIES CORPORATION, Carlsbad, CA (US); CELLOMICS, INC, Waltham, MA (US)

( * ) Notice: Subject to any disclaimer, the term of this patent is extended or adjusted under 35 U.S.C. 154(b) by 1076 days.

(21) Appl. No.: 17/501,506

(22) Filed: Oct. 14, 2021

(65) Prior Publication Data

US 2022/0120664 A1   Apr. 21, 2022

Related U.S. Application Data

(60) Provisional application No. 63/254,338, filed on Oct. 11, 2021, provisional application No. 63/092,783, filed on Oct. 16, 2020.

(51) Int. Cl.
  *G01N 15/1434*   (2024.01)
  *G06N 3/048*   (2023.01)
  (Continued)

(52) U.S. Cl.
  CPC ......... *G01N 15/1434* (2013.01); *G06N 3/048* (2023.01); *G06N 3/08* (2013.01);
  (Continued)

(58) Field of Classification Search
  CPC ....... G01N 15/1434; G01N 2015/1452; G01N 2015/1486; G01N 15/147;
  (Continued)

(56) References Cited

U.S. PATENT DOCUMENTS 6,246,785 B1   6/2001   Molnar et al.
6,330,350 B1   12/2001   Ahn et al.
(Continued)

FOREIGN PATENT DOCUMENTS

CN   102411715   4/2012
CN   105652429   6/2016
(Continued)

OTHER PUBLICATIONS

Automated Cell Counting And Cluster Segmentation Using Concavity Detection And Ellipse Fitting Techniques (Year: 2009).*
(Continued)

*Primary Examiner* — Jennifer Mehmood
*Assistant Examiner* — Pardis Sohraby

(57) ABSTRACT

Systems and methods for autofocus using artificial intelligence include (i) capturing a plurality of monochrome images over a nominal focus range, (ii) identifying one or more connected components within each monochrome image, (iii) sorting the identified connected components based on a number of pixels associated with each connected component, (iv) generating a focus quality estimate of at least a portion of the sorted connected components using a machine learning module, and (iv) calculating a target focus position based on the focus quality estimate of the evaluated connected components. The calculated target focus position
(Continued)

can be used to perform cell counting using artificial intelligence, such as by (i) generating a seed likelihood image and a whole cell likelihood image based on output—a convolutional neural network and (ii) generating a mask indicative quantity and/or pixel locations of objects based on the seed likelihood image.

16 Claims, 13 Drawing Sheets

(51) Int. Cl.
  *G06N 3/08* (2023.01)
  *G06T 3/40* (2006.01)
  *G06V 10/82* (2022.01)
  *G06V 20/69* (2022.01)
  *G01N 15/14* (2006.01)
(52) U.S. Cl.
  CPC ............... *G06T 3/40* (2013.01); *G06V 10/82* (2022.01); *G06V 20/695* (2022.01); *G01N 2015/1452* (2013.01); *G01N 2015/1486* (2013.01)
(58) Field of Classification Search
  CPC .. G01N 2015/1006; G06N 3/048; G06N 3/08; G06V 10/82; G06V 20/695; G06V 10/267; G06V 20/693; G06T 3/40; G02B 21/367; G02B 21/244; G02B 7/38
  USPC ........................................................ 382/173
  See application file for complete search history.

(56) References Cited

U.S. PATENT DOCUMENTS

| | | | |
|---|---|---|---|
| 7,042,639 B1 | 5/2006 | McDowell | |
| 7,139,415 B2 | 11/2006 | Finkbeiner | |
| 7,576,307 B2 | 8/2009 | Yazdanfar et al. | |
| 7,756,305 B2 | 7/2010 | Price | |
| 7,826,977 B2 | 11/2010 | Garty et al. | |
| 8,041,090 B2 | 10/2011 | Alexandrov et al. | |
| 8,488,863 B2 | 7/2013 | Boucheron | |
| 9,001,200 B2 | 4/2015 | Breniman et al. | |
| 9,177,192 B2 | 11/2015 | Wang et al. | |
| 9,739,783 B1 | 8/2017 | Kumar et al. | |
| 9,830,502 B2 | 11/2017 | Cohen et al. | |
| 9,971,966 B2 | 5/2018 | Nelson et al. | |
| 10,274,715 B2 | 4/2019 | Kuhn et al. | |
| 10,324,022 B2 | 6/2019 | Hsu et al. | |
| 10,330,907 B2 | 6/2019 | Tsujimoto | |
| 10,360,499 B2 * | 7/2019 | Kumar | G16B 40/20 |
| 10,402,623 B2 | 9/2019 | Zhang et al. | |
| 10,593,039 B2 | 3/2020 | Jalali et al. | |
| 10,611,995 B2 | 4/2020 | Masaeli et al. | |
| 11,301,965 B2 * | 4/2022 | Bai | G06T 3/4046 |
| 11,340,439 B2 * | 5/2022 | Dastidar | G06T 7/97 |
| 12,175,648 B2 * | 12/2024 | Schoenmakers | H01J 37/28 |
| 2002/0164063 A1 | 11/2002 | Heckman | |
| 2008/0051723 A1 | 2/2008 | Laermer et al. | |
| 2009/0195688 A1 | 8/2009 | Henderson et al. | |
| 2014/0192178 A1 | 7/2014 | Huang et al. | |
| 2017/0091948 A1 | 3/2017 | Paradkar et al. | |
| 2017/0108686 A1 | 4/2017 | Chan et al. | |
| 2018/0189606 A1 | 7/2018 | Tsumura | |
| 2018/0315190 A1 | 11/2018 | Sasagawa et al. | |
| 2019/0236778 A1 | 8/2019 | Saigo et al. | |
| 2019/0370967 A1 | 12/2019 | Matsubara et al. | |
| 2020/0072730 A1 * | 3/2020 | Wong | G01N 1/30 |
| 2020/0082222 A1 | 3/2020 | Cohen et al. | |
| 2020/0097701 A1 | 3/2020 | Chukka et al. | |
| 2020/0105376 A1 | 4/2020 | Lai et al. | |
| 2022/0046180 A1 * | 2/2022 | Sharoukhov | H04N 23/673 |
| 2022/0058369 A1 * | 2/2022 | Alahmari | G06F 18/285 |
| 2022/0307966 A1 * | 9/2022 | Qiu | B01L 3/5085 |

FOREIGN PATENT DOCUMENTS

| | | |
|---|---|---|
| CN | 107329233 | 11/2017 |
| CN | 110288605 | 9/2019 |
| CN | 106600577 | 10/2019 |
| DE | 102018219867 A1 | 5/2020 |
| EP | 3375859 | 9/2018 |
| EP | 3611654 | 2/2020 |
| JP | 2016212543 | 12/2016 |
| WO | WO2017145172 | 8/2017 |
| WO | WO2018057972 | 3/2018 |
| WO | WO20180760283 | 4/2018 |
| WO | WO2019034328 | 2/2019 |
| WO | WO2019084513 | 5/2019 |
| WO | WO2019084517 | 5/2019 |
| WO | WO2019148054 | 8/2019 |
| WO | WO2020018154 | 1/2020 |
| WO | WO2020/037305 | 2/2020 |
| WO | WO2020055810 | 3/2020 |
| WO | WO2020081343 | 4/2020 |

OTHER PUBLICATIONS

Yang, Samuel J., et al., "Assessing microscope image focus quality with deep learning", *BMC Bioinformatics*, vol. 19 (2018), pp. 77.
Liimatainen K, Kananen L, Latonen L, Ruusuvuori P. Iterative unsupervised domain adaptation for generalized cell detection from brightfield z-stacks. BMC Bioinformatics. Feb. 15, 2019;20(1):80.
Chen et al., "Weakly Supervised Deep Learning for Detecting and Counting Dead Cells in Microscopy Images", 2019 18th IEEE International Conference on Machine Learning and Applications (ICMLA), IEEE, Dec. 16, 2019, pp. 1737-1743.
Dastidar et al., "Automated Focus Distance Estimation for Digital Microscopy Using Deep Convolutional Neural Networks", 2019 XEEE/CVF Conference on Computer Vision and Pattern Recognition Workshops , IEEE, Jun. 16, 2019, pp. 1049-1056.
International Search Report and Written Opinion received for PCT Patent Application No. PCT/US2021/055008 , mailed on Apr. 25, 2022, 23 pages.
Najibi et al.,AutoFocus: Efficient Multi-Scale Inference 2019 IEEE/ CVF International Conference on Computer Vision (ICCV), IEEE, Oct. 27, 2019, pp. 9744-9754.
Ronneberger et al., "U-Net: Convolutional Networks for Biomedical Image Segmentation", Oct. 5, 2015, Advances in Biometrics :International Conference, ICB, Seoul, Korea, Aug. 27, 2009, pp. 8.
Wei et al., "Neural network control of focal position during time-lapse microscopy of cells", Scientific Reports, vol. 8, Issue 1, May 9, 2018, 10 Pages.
Yang et al., "Assessing microscope image focus quality with deep learning", BMC Bioinformatics, Biomed Central Ltd, London, UK, vol. 19, Issue 1, Mar. 15, 2018 , pp. 1-9.

* cited by examiner

SYSTEMS AND METHODS FOR AUTOFOCUS AND AUTOMATED CELL COUNT USING ARTIFICIAL INTELLIGENCE

CROSS-REFERENCE TO RELATED APPLICATIONS

This application claims priority to and the benefit of U.S. Provisional Patent Application No. 63/092,783, filed Oct. 16, 2020, and U.S. Provisional Patent Application No. 63/254,338, filed Oct. 11, 2021. The entireties of each of the foregoing applications are incorporated herein by this reference.

BACKGROUND

Technical Field

This disclosure generally relates to microscope image analysis. More specifically, the present disclosure relates to image analysis solutions for autofocus and cell count powered by artificial intelligence (AI).

Related Technology

Cytometry is the counting of cells and/or the measurement of cell characteristics. Various devices and methods are used in the field of cytometry to measure characteristics such as cell count, cell size, cell morphology, and cell lifecycle phase. Cytometry may also involve measuring various cellular components such as nucleic acids, the presence of particular proteins, cell typing and/or differentiation (e.g., viability counting), and various medical diagnostic applications.

There is an ongoing need for improvements in the field of cytometry and in the associated areas of image analysis.

BRIEF SUMMARY

Embodiments of the present disclosure provide systems and methods for autofocus and automated cell counting that present one or more advantages with respect to conventional approaches. For example, one or more embodiments can include a method of autofocusing an imaging system that includes the acts of capturing a plurality of images (e.g., monochrome images) over a nominal focus range, identifying one or more connected components within each image, sorting the identified connected components based on a number of pixels associated with each connected component, evaluating a focus quality estimate of at least a portion of the sorted connected components using a machine learning module, and calculating a target focus position based on the focus quality estimate of the evaluated connected components. Although the term "monochrome image" will be used in most of the examples presented herein, it will be understood that the same principles and features may also be utilized in applications involving other image types (e.g., color images). Thus, the examples described herein need not be limited to applications solely involving monochrome images.

In one aspect, sorting the identified connected components can additionally, or alternatively, be based on a circularity and/or a brightness associated with each connected component.

In one aspect, capturing a plurality of monochrome images includes capturing a monochrome 8-bit image (e.g., a 1280×960 monochrome 8-bit image) at each z-axis step over the nominal focus range. In one aspect, each z-axis step is a pre-determined size automatically determined based on a corresponding sample holder detected at the imaging system.

In one aspect, the act of identifying one or more connected components in each monochrome image includes thresholding each monochrome image to obtain a resultant binary image for each monochrome image, applying one or more morphological operators to the resultant binary image, and defining one or more connected components within the resultant binary image. In one aspect, the thresholding is based on a difference between minimum and maximum images for the nominal focus range. In one additional or alternative aspect, the act of applying the one or more morphological operators includes applying one or more of a morphological closing, a morphological opening, and/or a foreground hole fill. In one aspect, the morphological closing includes a 2×2 morphological closing and/or the morphological opening includes a 2×2 morphological opening. Additionally, or alternatively, the foreground hole fill includes an 8-connected foreground hole fill.

In one aspect, the act of identifying one or more connected components in each monochrome image includes measuring first and second binary moments of each connected component, fitting a corresponding ellipse with equivalent moments to each connected component, and creating a second binary image comprising the corresponding ellipses. In one aspect, the method further includes measuring each connected component in the second binary image and removing any connected component having an ellipse minor-axis less than 15 µm, or less than 10 µm, preferably less than 7 µm, and more preferably less than 5 µm.

In one aspect, the act of sorting the identified connected components includes counting the number of pixels in each connected component, calculating a median pixel count over the one or more connected components, and sorting the connected components based on a corresponding absolute difference of the number of pixels from the median pixel count. In one aspect, the connected components are sorted in ascending (or descending) order by the corresponding absolute difference of the number of pixels from the median pixel count.

In one aspect, the act of sorting the identified one or more connected components includes ordering a calculated joint probability that the connected component represents (i) a cell and optionally (ii) that the cell is alive. The connected components having the greatest joint probability can be sorted for further evaluation of the focus quality estimate using a machine learning module.

In one aspect, the act of sorting the identified one or more connected components includes determining one or more of a circularity or a brightness of each connected component, and sorting the connected components based on a comparative circularity and/or brightness determined for each of the connected components.

In one aspect, methods of autofocusing an imaging system can include forming a z-stack of a particular pixel dimension (e.g., 32×32 or other appropriate size) for each connected component. In one aspect, the machine learning module includes an artificial neural network that receives the pixel z-stack for each connected component as an input. In one aspect, the artificial neural network includes a plurality of feature identification layers having a design pattern of a convolution layer, a linear layer, and a max-pooling layer. In one aspect, the convolution layer includes a 3×3 convolution layer, the linear layer includes a ReLu nonlinearity function, and/or the max-pooling layer includes a 2×2 max-pooling layer or average pooling layer.

In one aspect, the artificial neural network includes a long-short-term-memory (LSTM) process layer following the plurality of feature identification layers, and the LSTM layer processes the z-stack for each connected component in a bi-directional manner. In one aspect, the artificial neural network includes a final linear layer that is combined with an output of the LSTM layer to define the focus quality estimate.

Embodiments of the present disclosure additionally include computer systems configured to autofocus an imaging system. In one aspect, a computer system configured to autofocus an imaging system includes one or more processors and one or more hardware storage devices having stored thereon computer-executable instructions that when executed by the one or more processors configure the computer system to perform any one or more of the methods disclosed herein.

Embodiments of the present disclosure may additionally include methods of performing automated cell counting that include the acts of obtaining an image and defining a set of one or more tiles based on the image, processing the one or more tiles using a convolutional neural network, and constructing a plurality of pseudo-probability maps based on output of the convolutional neural network. The plurality of pseudo-probability maps may include at least one or more seed likelihood images. The acts may further include generating one or more masks based on the one or more seed likelihood images. The one or more masks may define pixel locations for one or more objects represented in the one or more seed likelihood images. The one or more masks may indicate/provide a cell count.

In one aspect, methods of performing automated cell counting include performing connected-component analysis on the one or more seed likelihood images to determine the cell count.

In one aspect, the plurality of pseudo-probability maps further comprises one or more whole cell likelihood images, and the methods of performing automated cell counting include generating one or more segmented images based on at least the one or more whole cell likelihood images and the one or more masks, wherein the one or more segmented images indicates/provides a cell count.

In one aspect, the image is captured at a target focus position.

In one aspect, the convolutional neural network is trained with a set of training data comprising images from multiple focal planes relative to the focus position, preferably ranging from −2 to +2 z-position, to increase a robustness of the method and to reduce a sensitivity of the method to autofocus output accuracy. The set of training data may comprise ground truth output including one or more whole cell binary masks and/or one or more seed masks. The images of the set of training data may comprise pre-processed images.

In one aspect, the image comprises a 2592×1944 monochrome 8-bit image having a pixel size of 0.871 µm. Other types of images (e.g., with different dimensions, bit values, and/or pixel size) may also be utilized.

In one aspect, methods of performing automated cell counting further include performing one or more pre-processing operations. The one or more pre-processing operations may be performed based on the image to generate a pre-processed image. The set of one or more tiles may be decomposed from the pre-processed image, or the one or more pre-processing operations may be performed on the one or more tiles.

The one or more pre-processing operations may comprise a downsampling operation. The downsampling operation may utilize an averaging filter. The downsampling operation may reduce image size by a factor of at least 2.

The one or more pre-processing operations may comprise a background removal operation. In some instances, the background removal operation comprises estimating a background by calculating a per-pixel local mean within a radius of each pixel and subtracting the background from the image. In some instances, the background removal operation comprises calculating a respective minimum value in each image region of the image or a downsampled image and fitting a surface through the respective minimum values.

The one or more pre-processing operations may comprise a pixel or voxel intensity normalization operation. The pixel or voxel intensity normalization operation may comprise a global normalization operation. The pixel or voxel intensity normalization operation may comprise a kernel-based normalization operation.

In one aspect, at least some of the one or more pre-processing operations are performed as a batch process on the one or more tiles provided as input to the convolutional neural network.

In one aspect, defining the set of one or more tiles includes forming a reflected image, decomposing the reflected image into the set of one or more tiles with pixel overlap, and storing the set of one or more tiles into a tensor array. Reflecting the downsampled image may extend its edges by a number of pixels (e.g., 4-12 pixels, or 6-10 pixels, or 8 pixels), and the reflected image may be decomposed into a set of tiles with pixel overlap. In a non-limiting example, the reflected image is decomposed into 130 tiles of 128×128 pixels with 8 pixels overlap. The tensor array may comprise a 130×1×128×128 tensor array or other appropriate tensor array based on the number of tiles, image size, and other image characteristics.

In one aspect, the convolutional neural network comprises a U-net convolutional neural network. The output of the convolutional neural network may be stored in an appropriate tensor array (e.g., a 130×4×128×128 tensor array).

In one aspect, constructing the plurality of pseudo-probability maps comprises converting the output of the convolutional neural network into tensor (e.g., an 8-bit format) and image stitching the tensor. Converting the output into the tensor may comprise multiplying the tensor array (e.g., 130×4×128×128 tensor array) by a multiplier (e.g., 255). Image stitching the tensor may comprise constructing a number (e.g., 4) of full-size pseudo-probability maps from the tiles. The plurality of pseudo-probability maps may comprise (i) one or more live cell seed likelihood images, preferably indicating one or more center locations of live cells, (ii) one or more live whole cell likelihood images, (iii) one or more dead cell seed likelihood images, preferably indicating one or more center locations of dead cells, and (iv) one or more dead whole cell likelihood images, respectively.

In one aspect, generating the one or more masks comprises applying a threshold value greater than 75% likelihood. The threshold value may correspond to a threshold value of 192 (0.75×255) in pixel intensity in the plurality of pseudo-probability maps. Other threshold values may be utilized, such as, by way of non-limiting example, threshold values within a range of about 50% to about 90% likelihood. Generating the one or more masks may further comprise applying connected-component labeling to detect connected regions, and the one or more masks may be generated utilizing a deep learning algorithm.

In some instances, generating the one or more segmented images comprises applying a watershed transform on a distance map computed from the pixel locations of the one or more objects represented in the one or more seed likelihood images and delimited by the one or more whole cell likelihood images.

In one aspect, methods of performing automated cell counting further include determining the cell count based on the output of the convolutional neural network. Methods of performing automated cell counting may further include displaying the cell count based on the output of the convolutional neural network.

In one aspect, methods of performing automated cell counting further include performing one or more feature calculation operations using the one or more segmented images. the one or more feature calculation operations may comprise ellipse-fitting cells within the one or more segmented images. Ellipse-fitting may comprise measuring object size (e.g., in μm), constructing a histogram of object size, pixel intensity, and/or calculating object circularity.

In one aspect, the image comprises a monochrome image.

Embodiments of the present disclosure additionally include computer systems configured to perform automated cell counting. For example, a computer system for performing automated cell counting can include one or more processors and one or more hardware storage devices having stored thereon computer-executable instructions that when executed by the one or more processors configure the computer system to perform any one or more method of performing automated cell counting as disclosed herein.

Accordingly, systems and methods of autofocusing an imaging system and/or performing automated cell counting are disclosed. In some embodiments, systems and methods disclosed herein enable automated cell viability counting.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations disclosed herein. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Figure 1:
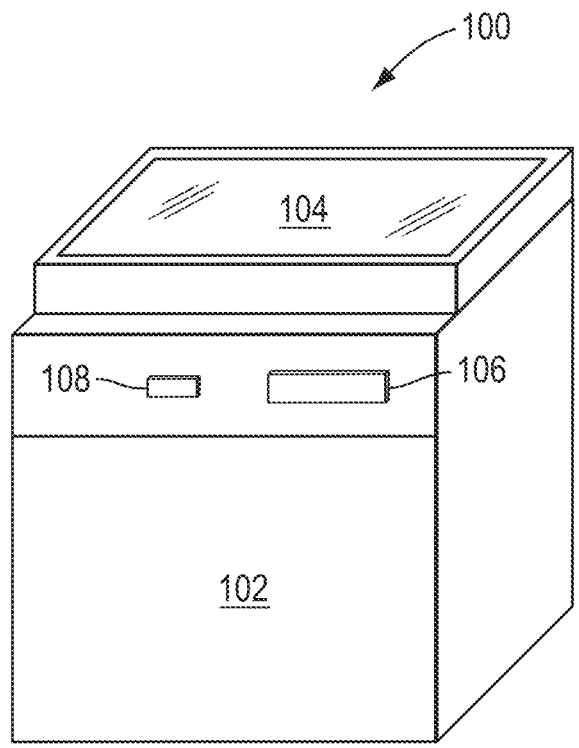
FIG. 1 illustrates a perspective view of an imaging system configured to perform one or more of the methods disclosed herein, including methods of artificial intelligence (AI) assisted autofocus and automated cell viability count, in accordance with one or more embodiments of the present disclosure.

Before describing various embodiments of the present disclosure in detail, it is to be understood that this disclosure is not limited to the parameters of the particularly exemplified systems, apparatuses, methods, and/or processes, which may, of course, vary. Thus, while certain embodiments of the present disclosure will be described in detail, with reference to specific configurations, parameters, components, elements, etc., the descriptions are illustrative and are not to be construed as limiting the scope of the present disclosure. In addition, the terminology used herein is for the purpose of describing the embodiments and is not necessarily intended to limit the scope of the present disclosure.

It will be appreciated that systems, apparatuses, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about." The terms "about," "approximately," "substantially," or their equivalents, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

Overview of Systems and Methods for AI-Assisted Autofocusing and Cell Viability Counting Cell viability counting was traditionally a manual, time-intensive process. Advances in the field of image processing have enabled imaging systems to automate some of these manual tasks or otherwise to reduce the amount of time and manual effort associated with determining cellular concentrations in a sample, particularly with respect to ascertaining the proportional number of live/dead cells (or viability counting) within a given sample. While these innovations show promise, they ultimately fall short of the accuracy and precision of manual cell viability counting.

Prior art systems and methods for analyzing cell viability within a sample suffer from many drawbacks. For example, many of the cell viability systems require use of dyes, labels, or other compounds to determine the viability of cells within a sample. The use of many of these compounds often require specialized, expensive, and/or bulky equipment to retrieve a readout of the results. As such, the equipment is unlikely to be readily available and/or positioned within the lab space as to make it accessible or convenient to use.

Some prior art systems rely on computationally intensive algorithms to identify and differentiate between live and dead cells within a sample. Unfortunately, these systems generally require access to dedicated and robust computational resources, such as graphics processing units (GPUs) or distributed computational resources that can more quickly compute and process the massive amounts of data involved with known image recognition and processing algorithms. Unfortunately, access to a network or cloud computing environment that may allow for distributed computing resources and more rapid analysis of image acquired cell viability data is not always available or practicable. Indeed, the confidential nature of some laboratory samples and/or ongoing experiments results in increased security measures that prevent access to a networked computing resource like the cloud, including situations where such resources and analysis capabilities are provided by a third party and privacy concerns exist with respect to the laboratory samples.

There is a dearth of systems that are compact, relatively inexpensive, and that can be conveniently located and accessed from a common workplace without taking up a large footprint on the benchtop or otherwise requiring an isolated and dedicated environment. Adding a GPU or otherwise increasing the computational power of existing systems is impractical for some devices. The additional computational power requires additional space within the system, causes additional heat, and increases the overall cost of the system—both upfront and operationally (however, the principles disclosed herein may be implemented on devices that utilize one or more GPUs). Yet, without the additional computational resources to process the image data, conventional systems are incapable of providing the desired results in a timely fashion, if at all. Known cell viability counting systems are unable to get live cells in focus while ignoring dust, debris, manufacturing defects on the bottom of the counting chamber, and other non-cellular particles on microscope images. These artifacts become conflated in the results, preventing the current systems from accurately and precisely discriminating cellular from non-cellular particles. As a result, the current cell viability counting systems are ineffective at producing consistent, accurate measures of cell viability within samples.

Therefore, there is a need for a cost-effective, compact, and secure benchtop imaging system that performs accurate, rapid autofocusing and cell viability count of associated samples.

As alluded to above, prior art systems and methods for autofocusing and analyzing cell viability within a sample suffer from many drawbacks. Among other things, there has traditionally been a high computational cost associated with image processing that has heretofore prevented non-specialized laboratory equipment from quickly and accurately focusing on and identifying live/dead cells within a sample. Problematically, prior known methods rely on the evaluation of higher resolution images in an attempt to use the additional data provided thereby to resolve the differences between live/dead cells. This practice necessarily requires a large investment in additional computational resources, such as a battery of dedicated GPUs or access to a large, distributed computing environment.

There is a dearth of systems that are compact, relatively inexpensive, and that can be conveniently located and accessed from a common workplace without taking up a large footprint on the benchtop or otherwise requiring an isolated and dedicated environment. Adding a GPU or otherwise increasing the computational power of existing systems is impractical for some devices. The additional computational power requires additional space within the system, causes additional heat, and increases the overall cost of the system—both upfront and operationally. Although embodiments described herein may be implemented on devices that utilize one or more GPUs. However, in certain applications, without the additional computational resources to process the image data, conventional systems are incapable of providing the desired results in a timely fashion, if at all. Known cell viability counting systems are unable to get live cells in focus while ignoring dust, debris, manufacturing defects on the bottom of the counting chamber, and other non-cellular particles on microscope images. These artifacts become conflated in the results, preventing the current systems from accurately and precisely discriminating cellular from non-cellular particles. As a result, the current cell viability counting systems are ineffective at producing consistent, accurate measures of cell viability within samples.

The systems and methods disclosed herein solve one or more of the noted problems in the art and beneficially enable a rapid autofocus (e.g., on a mixture of live and dead cells) using minimal processing cycles and without needing additional processing hardware. The improved autofocusing methods disclosed herein are powered by artificial intelligence and allow for the rapid and reliable identification of the target focus position in any given sample. This rapid and low cost method of identifying a target focus position within a sample is incorporated into many of the disclosed cell viability count methods as a first step that enables the rapid (e.g., less than 20 seconds, preferably less than 10 seconds) identification and/or display of a representation of cell viability counts.

FIG. 1 illustrates a perspective view of an imaging system 100 configured to perform one or more of the methods disclosed herein. For example, the imaging system 100 of FIG. 1 is operable to facilitate the method associated with flow diagram 200 of AI-assisted autofocus and/or automated cell viability count disclosed by the example flow diagram of FIG. 2. As shown, the imaging system 100 includes a housing 102, which encloses and protects the microscope and computing systems used for autofocusing and conducting cell viability counts. The housing 102 includes a slide port/stage assembly 106 operable to receive a cell counting slide into the imaging system (act 202). Once received therein, the imaging system 100 then determines a target focus position for imaging cells on the cell counting slide (act 204) and performs automated cell viability counting using the target focus position (act 206). A representation of the cell viability count is displayed (act 208) at the imaging system 100 using, for example, display 104. This representation and/or other data associated with the automated cell viability count can be removed from the imaging system 100 and/or saved to a separate device through user interaction with the communications module 108, which in some embodiments can include a USB port or other data exchange port known in the art.

One will appreciate, in view of the present disclosure, that the principles described herein may be implemented utilizing any suitable imaging system and/or any suitable imaging modality. The specific examples of imaging systems and imaging modalities discussed herein are provided by way of example and as a means of describing the features of the disclosed embodiments. Thus, the embodiments disclosed herein are not limited to any particular microscopy system or microscopy application and may be implemented in various contexts, such as brightfield imaging, fluorescence microscopy, flow cytometry, confocal imaging (e.g., 3D confocal imaging, or any type of 3D imaging), and/or others. For example, principles discussed herein may be implemented with flow cytometry systems to provide or improve cell counting capabilities. As another example, cell count and/or viability data obtained in accordance with techniques of the present disclosure may be used to supplement fluorescence data to improve accuracy in distinguishing among different cells.

Furthermore, one will appreciate, in view of the present disclosure, that any number of principles described herein may be implemented in various fields. For example, a system may implement the cell counting techniques discussed herein without necessarily also implementing the autofocus, cell viability determination and/or feature detection techniques discussed herein.

Figure 3:
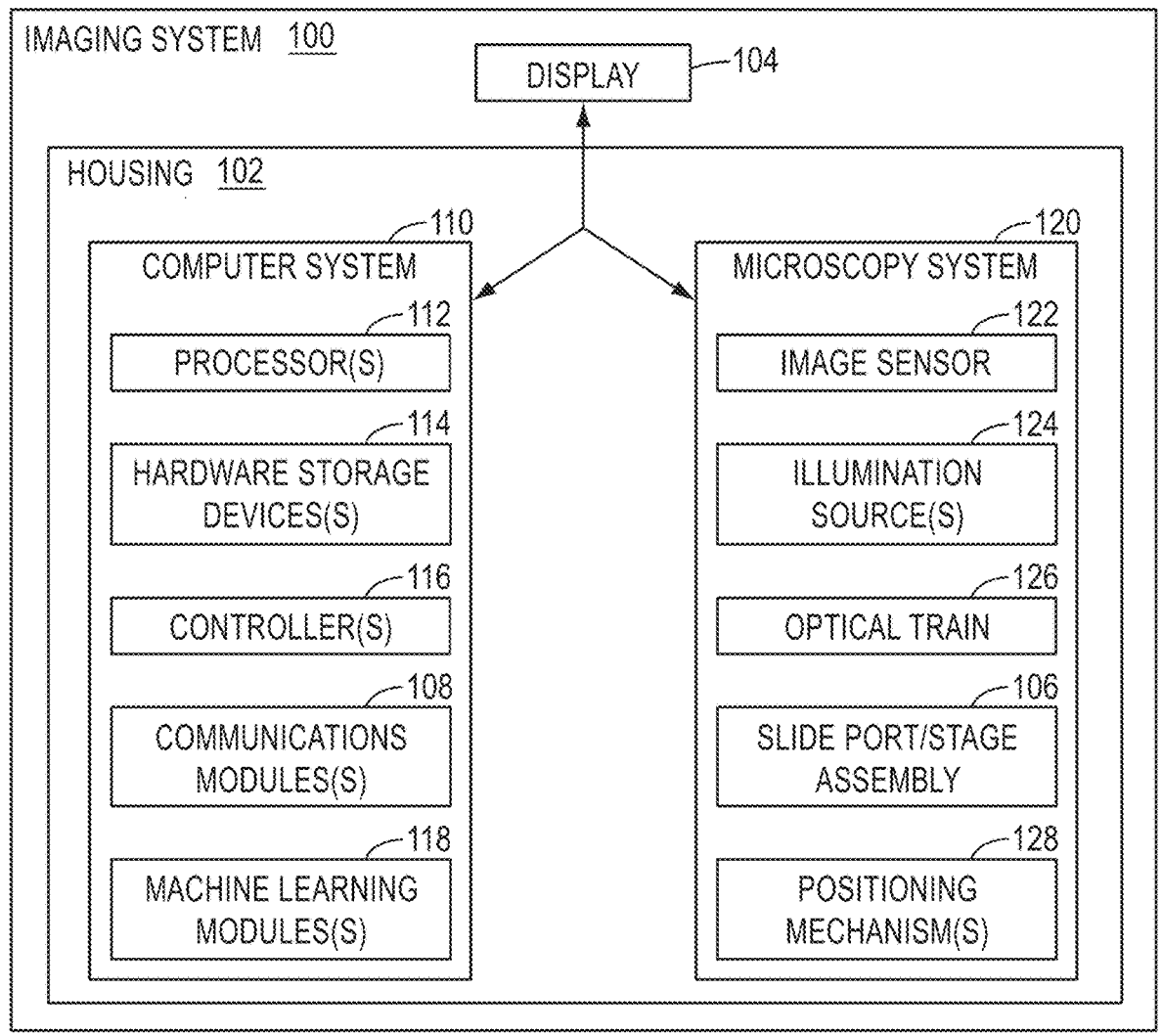
FIG. 3 illustrates a schematic of various example components within the imaging system of FIG. 1, in accordance with one or more embodiments of the present disclosure.

FIG. 3 illustrates a schematic of various example components within the imaging system 100 of FIG. 1, in accordance with one or more embodiments of the present disclosure. For example, FIG. 3 illustrates that the imaging system 100 may include a computer system 110 and a microscopy system 120 included therewith. FIG. 3 conceptually represents the computer system 110 and the microscopy system 120 as disposed within the housing 102 of the imaging system 100. However, one will appreciate, in view of the present disclosure, that any portion of the computer system 110 or the microscopy system 120 may be disposed at least partially outside of the housing 102 within the scope of the disclosed embodiments.

FIG. 3 shows that the computer system 110 of the imaging system 100 can comprise various components, such as processor(s) 112, hardware storage device(s) 114, controller(s) 116, communications module(s) 108, and/or machine learning module(s) 118.

The processor(s) 112 may comprise one or more sets of electronic circuitry that include any number of logic units, registers, and/or control units to facilitate the execution of computer-readable instructions (e.g., instructions that form a computer program). Such computer-readable instructions may be stored within the hardware storage device(s) 114, which may comprise physical system memory and which may be volatile, non-volatile, or some combination thereof. Additional details related to processors (e.g., processor(s)

112) and computer storage media (e.g., hardware storage device(s) 114) will be provided hereinafter.

The controller(s) 116 may comprise any suitable software components (e.g., set of computer-executable instructions) and/or hardware components (e.g., an application-specific integrated circuit, or other special-purpose hardware component(s)) operable to control one or more physical apparatuses of the imaging system 100, such as portions of the microscopy system 120 (e.g., the positioning mechanism(s) 128).

The communications module(s) 108 may comprise any combination of software or hardware components that are operable to facilitate communication between on-system components/devices and/or with off-system components/devices. For example, the communications module(s) 108 may comprise ports, buses, or other physical connection apparatuses for communicating with other devices (e.g., USB port, SD card reader, and/or other apparatus). Additionally, or alternatively, the communications module(s) 108 may comprise systems operable to communicate wirelessly with external systems and/or devices through any suitable communication channel(s), such as, by way of non-limiting example, Bluetooth, ultra-wideband, WLAN, infrared communication, and/or others.

The machine learning module(s) 118 may also comprise any combination of software or hardware components that are operable to facilitate processing using machine learning models or other artificial intelligence-based structures/architectures. For example, machine learning module(s) 118 may comprise hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As shown in FIG. 3, the imaging system 100 includes a microscopy system 120 having an image sensor 122, and illumination source 124, and optical train 126, the slide port/stage assembly 106 for receiving the sample slide, and a positioning mechanism 128.

The image sensor 122 is positioned in the optical path of the microscopy system and configured to capture images of the samples, which will be used in the disclosed methods to identify a target focus position and subsequently for performing automated cell viability counting. As used herein, the term "image sensor" or "camera" refers to any applicable image sensor compatible with the apparatuses, systems and methods described herein, including but not limited to charge-coupled devices, complementary metal-oxide-semiconductor devices, N-type metal-oxide-semiconductor devices, Quanta Image Sensors, combinations of the foregoing such as scientific complementary metal-oxide-semiconductor devices, and the like.

The optical train 126 may include one or more optical elements configured to facilitate viewing of the cell counting slide by directing light from the illumination source 124 toward the received cell counting slide. The optical train 126 may also be configured to direct light scattered, reflected, and/or emitted by a specimen within the cell counting slide toward the image sensor 122. The illumination source 124 may be configured to emit various types of light, such as white light or light of one or more particular wavelength bands. For example, the illumination source 124 can include a light cube (e.g., Thermo Fisher EVOS™ light cubes), which may be installed and/or exchanged within the housing to any of a desired set of illumination wavelengths.

The positioning mechanism 128 can include any of an x-axis motor, a y-axis motor, and a z-axis motor that are operable to adjust the components of the optical train 126 and/or image sensor 122 accordingly.

FIG. 3 furthermore illustrates that, in some instances, the imaging system 100 includes a display 104. FIG. 3 indicates that the display 104 may be in communication, whether directly or indirectly, with various other components of the imaging system 100, such as the computer system 110 or the microscopy system 120 thereof (e.g., as indicated in FIG. 3 by the tri-headed arrow). For example, the imaging system 100 may capture images using components of the microscopy system 120, and captured images may be processed and/or stored using components of the computer system 110 (e.g., processor(s) 112, hardware storage device(s) 114), machine learning module(s) 118, etc.), and the processed and/or stored images may be displayed on the display 104 for observation by one or more users.

As will be described herein, the components of the imaging system 100 may facilitate AI-assisted autofocusing on a sample contained within a cell counting slide that is imaged by the imaging system 100, as well as AI-assisted cell viability counting on the sample contained within the cell counting slide. In some instances, a representation of results of AI-assisted cell viability counting (which may be performed according to a target focus position as determined via AI-assisted autofocusing) may be displayed on the display 104 of the imaging system 100 within a short time period after initiating autofocusing and cell viability counting processing for a cell counting slide inserted into the imaging system 100 (e.g., within a time period of about 20 seconds or less, or within about 10 seconds or less).

One will appreciate, in view of the present disclosure, that an imaging system may comprise additional or alternative components relative to those shown and described with reference to FIG. 3, and that such components may be organized and/or distributed in various manners.

Systems and Methods for Facilitating AI-Assisted Autofocus

Figure 2:
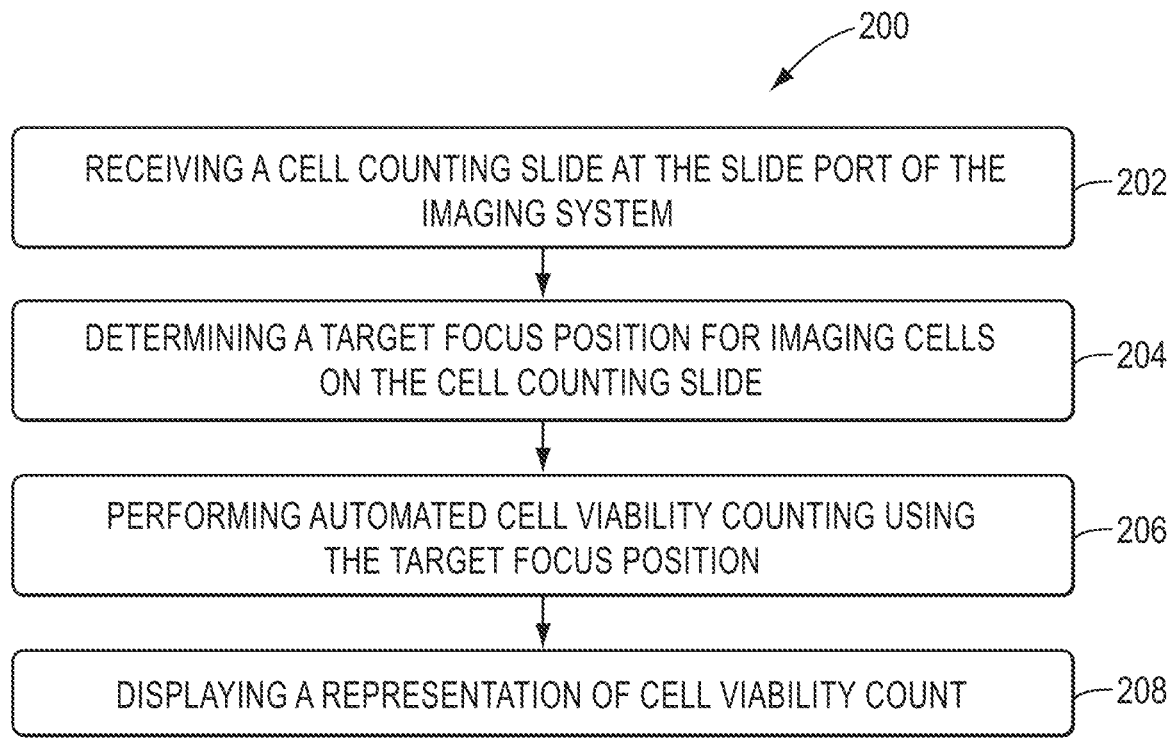
FIG. 2 is an example flow diagram that illustrates various acts performable by the imaging system of FIG. 1 for facilitating AI-assisted autofocus and automated cell viability count, in accordance with one or more embodiments of the present disclosure.
Figure 4:
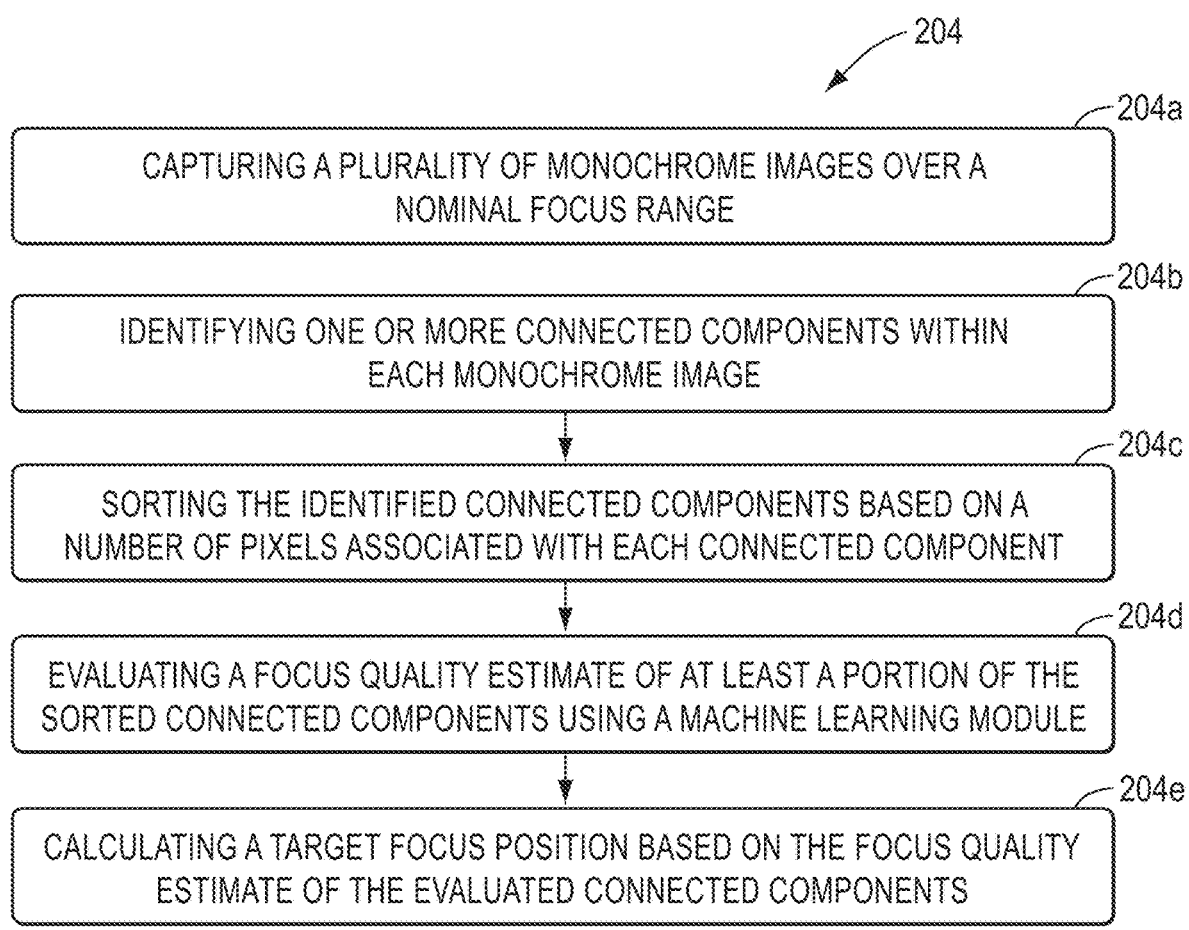
FIG. 4 is an example flow diagram that illustrates various acts for determining a target focus position, in accordance with one or more embodiments of the present disclosure.

As noted hereinabove, facilitating autofocus and cell viability counting powered by artificial intelligence involves determining a target focus position for imaging cells on a cell count slide (act 204, as noted hereinabove with reference to FIG. 2). Determining a target focus position for imaging cells on a cell count slide can be associated with various acts. FIG. 4 illustrates an example flow diagram depicting various acts associated with act 204 from flow diagram 200 for determining a target focus position for imaging cells on a cell count slide. Although the acts shown in flow diagram 200 may be illustrated and/or discussed in a certain order, no particular ordering is required unless specifically stated or required because an act is dependent on another act being completed prior to the act being performed. Furthermore, it should be noted that not all acts represented in the flow diagrams are essential for facilitating the disclosed methods, including those methods for AI-assisted autofocus and automated cell viability count disclosed herein.

Act 204a associated with act 204 includes capturing a plurality of monochrome images over a nominal focus range. In some implementations, act 204 is performed by the imaging system 100 using the processor(s) 112, hardware storage device(s) 114, and/or controller 116 of the computer system 110, as well as the image sensor 122, illumination source(s) 124, optical train 126, slide port/stage assembly 106, and/or positioning mechanism of the microscopy system 120.

By way of example, the imaging system 100 may employ the processor(s) 112 in conjunction with one or more sensors to identify a sample holder (e.g., a cell counting slide) arranged within the slide port/stage assembly 106. In some instances, the imaging system 100 automatically identifies a type of sample holder (e.g., a disposable cell counting slide or a re-suable cell counting slide) and automatically determines image capture settings based on the type of sample holder detected. For example, the imaging system 100 may identify image z-axis step height/size and/or initial nominal focus range based on whether the cell counting slide is disposable or re-usable, and/or based on other attributes of the cell slide (e.g., a determined sample holder, coverslip, and/or other substrate thickness).

Furthermore, the imaging system 100 may utilize the processor(s) 112 and/or controller 116 to cause the positioning mechanism 128 to position the optical train 126 relative to the slide port/stage assembly 106 to facilitate capturing images of the cell counting slide (e.g., a sample within the cell counting slide). The imaging system 100 may employ the image sensor 122 and the illumination source(s) 124 in combination with any of the above to capture images of the cell counting slide. Furthermore, the imaging system 100 may capture additional images of the cell counting slide under different relative positionings of the slide port/stage assembly 106 and the optical train 126 to obtain a plurality of monochrome images over the nominal focus range. In some implementations, the monochrome images comprise 8-bit images with a resolution of 1280×960, and each of the monochrome images are captured at each z-axis step over the nominal focus range.

Any instructions for performing the acts described herein and/or data used or generated/stored in association with performing the acts described herein (e.g., cell counting slide type, nominal focus range, z-axis step, monochrome images, and others) may be stored within the hardware storage device(s) 114 in a volatile or non-volatile manner.

Act 204b associated with act 204 includes identifying one or more connected components within each monochrome image. In some implementations, the imaging system 100 utilizes one or more of the processor(s) 112, hardware storage device(s) 114, and/or machine learning module(s) 118 to identify connected components within each monochrome image.

As used herein, "connectedness", as used in "connected components", refers to which pixels are considered neighbors of a pixel of interest. After a suitable digitized image is available (e.g., from the plurality of monochrome images obtained according to act 204a), all connected components within the image are initially identified. A connected component is a set of pixels of a single value, for example, the value representing black, wherein a path can be formed from any pixel of the set to any other pixel in the set without leaving the set, for example, by traversing only black pixels. In general terms, a connected component may be either "4-connected" or "8-connected." In the 4-connected case, the path can move in only horizontal or vertical directions, so there are four possible directions. Accordingly, two diagonally adjacent black pixels are not 4-connected, unless there is another black pixel horizontally or vertically adjacent, serving as a bridge between the two. In the 8-connected case, the path between pixels may also proceed diagonally. One embodiment uses 8-connected components, but 4-connected components could also be identified and used For example, in some implementations, identifying the connected components of each monochrome image is performed by thresholding the monochrome image to obtain a resulting binary image for each monochrome image. Thresholding may be performed based on a difference between the minimum and maximum images for the nominal focus range described hereinabove referring to act 204a. Various methodologies for thresholding are within the scope of this disclosure, such as the "upper triangle" thresholding method.

In addition to thresholding, identifying connected components of each monochrome image may include applying one or more morphological operators to each of the resultant binary images. The morphological operations/operators may include, by way of non-limiting example, morphological closing, morphological opening, and/or foreground hole filling. For instance, cells may be represented in binary images as comprising fjords (C-shaped artifacts or irregularities) due to improper or suboptimal lighting, focusing, image sensing, and/or post-processing (e.g., thresholding). In some instances, based on the supposition that cells should comprise a round shape, a morphological closing operation may fill any fjords present in the monochrome image to approximate cell shape in the binary images. In one embodiment, a morphological closing operation utilizes a 2×2 mask size.

Furthermore, in some instances, cells may be represented in binary images as comprising tendrils (e.g., offshoots) that extend beyond the cell wall due to improper or suboptimal lighting, focusing, image sensing, and/or post-processing (e.g., thresholding). Thus, in some implementations, a system may perform morphological opening operations to trim or remove tendrils from binary images to improve approximations of cell shape in the binary images. In one embodiment, a morphological opening operation is performed using a 2×2 mask size.

In addition, foreground holes may appear in the set of binary images based on the appearance of cells from different focus positions (e.g., the different z-height focus positions from which the plurality of monochrome images was captured according to act 204a). Thus, in some instances, foreground hole fill operations may be performed to expand connected pixels in a way that fills such foreground holes. In one embodiment, the foreground hole fill operation is an 8-connect foreground hole fill operation, but, in some implementations, the foreground hole fill operation is a 4-connect foreground hole fill operation, In some instances, after performing desired morphological operations on each binary image (e.g., morphological opening, morphological closing, foreground hole fill), the imaging system 100 may define the connected components within each binary image in preparation for additional processing. However, in some instances, additional operations may be performed to identify the connected components in preparation for additional processing.

For example, in some implementations, the imaging system 100 measures first and second binary moments for each connected component defined within each of the binary images described above. In some instances, the first and second binary moments of a particular connected component may be correlated with axes of an ellipse, which may serve as an approximation for cell shape. Accordingly, for a particular connected component, the imaging system 100 may fit an ellipse to the particular connected component, where the ellipse has moments that are based on the measured first and second binary moments for the particular connected component.

In this way, an imaging system 100 may fit ellipses to each connected component defined within each of the binary images described above. In some implementations, the imaging system 100 generates second binary images from each binary image described above (e.g., each binary image generated from thresholding each monochrome image). The second binary images may include connected components that are generated/defined based on the ellipses fit from the first and second binary moments measured for each connected component from the binary images described above. In this regard, in some instances, the ellipse-based connected components of the second binary images may assist the imaging system 100 in approximating cell shape.

In some implementations, the second binary images are used for further processing to determine a target focus position, according to the present disclosure. However, in some implementations, the imaging system 100 generates a third set of binary images based on the first binary images and the second binary images and uses the third set of binary images for further processing to determine a target focus position. The third set of binary images may be generated by merging or taking a union of each binary image (or initial binary image generated by thresholding each corresponding monochrome image) with its corresponding second binary image.

Regardless of whether the imaging system 100 will utilize the first binary images, the second binary images, or the set of third binary images for further processing to determine a target focus position, the imaging system 100 may, in some implementations, measure each connected component and remove any connected components that fail to satisfy a predetermined size condition. For example, the imaging system 100 may remove connected components from any of the first, second, or third binary images that comprise a minor axis length or diameter (e.g., an ellipse minor axis length) of less than 40 μm. In some implementations, the predetermined size condition is selected based on the type(s) of cell(s) being counted. For instance, for T cells, B cells, NK cells, and/or monocytes, the imaging system 100 may remove connected components with a minor axis diameter that is outside of a range of about 2-40 μm, whereas for other cells, the imaging system 100 may remove connected components with a minor axis diameter that is outside of a range of about 2-8 μm. Such a minor axis length diameter may be set at 2 μm, 4 μm, 6 μm, 8 μm, 10 μm, 15 μm, 20 μm, 25 μm, 30 μm, 35 μm, 40 μm, 45 μm, or 50 μm, or at a range with endpoints defined by any two of the foregoing values, for example, depending on particular application needs.

Act 204c associated with act 204 includes sorting the identified connected components based on a number of pixels associated with each connected component. As mentioned above, the identified connected components that become sorted according to act 204c may be from the third set of binary images, the second binary images, or even the initial binary images described hereinabove with reference to act 204b. In some implementations, an imaging system 100 utilizes processor(s) 112 to sort the identified connection components based on the number of pixels associated with each connected component.

Sorting the identified connection components according to act 204c may include various acts/steps. For example, in some instances, sorting the identified connection components may include counting a number of pixels included in each connected component, calculating a median pixel count for the connected components, and sorting the connected components based on the median pixel count (e.g., based on an absolute difference between the number of pixels within each respective connection component and the median pixel count).

In some instances, the imaging system 100 utilizes one or more other inputs for sorting the identified connection components in addition, or as an alternative, to pixel count. For example, an imaging system 100 may utilize pixel brightness of the imaged component and/or a measure of relative circularity of the imaged component. Based on the brightness and/or circularity of the imaged component, the imaging system 100 may determine a probability that the imaged component is a cell and a separate probably that the cell is alive (e.g., a live cell or a dead cell). These two probabilities may be combined (e.g., by multiplying the two probabilities together) to form joint probability that the imaged component is a live cell (e.g., a probability that the component is a cell based on brightness alone, and a probability that the component is a cell based on circularity alone).

The connected components may be sorted in ascending order or descending order. In some instances, sorting the connected components in ascending order has the effect of moving connected components that approximate an ordinary size of a cell to the front of the list while moving connected components that more likely approximate other objects (e.g., clumps and debris particles) to the end of the list.

Furthermore, in some instances, the imaging system 100 modifies the list by removing list elements that are unlikely to approximate ordinary or expected cell size. For example, the imaging system 100 may utilize a gaussian or other distribution about the list median to remove certain list elements, such as list elements that fall outside of a predetermined distance or difference from the list median. In other examples, the imaging system 100 utilizes a maximum list value as a starting point for determining which list elements to remove.

Act 204d associated with act 204 includes evaluating a focus quality estimate of at least a portion of the sorted connected components using a machine learning module. In some implementations, the imaging system 100 utilizes the processor(s) 112 and/or machine learning module(s) 118 to evaluate a focus quality estimate of at least a portion of the sorted connection components.

By way of context, at its core, artificial intelligence attempts to model human thought or intelligence to solve complex or difficult problems. Machine learning is one form of artificial intelligence that utilizes computer models and some form of feedback to "learn" from data without a complex set of prescribed rules. Most machine learning algorithms can be classified based on the type of feedback used in the learning process. For example, in unsupervised learning models, unlabeled data is input into the machine learning algorithm from which general structures are extracted. Unsupervised learning algorithms can be powerful tools for clustering data sets. Supervised learning models, on the other hand, utilize labeled input data to train machine learning algorithms to "learn" a model for reliably predicting a desired outcome. As such, supervised machine learning models can be powerful tools for classifying datasets or performing regression analyses.

Neural networks encompass a broad category of machine learning algorithms that attempt to simulate complex thinking and decision processes with the aid of computers by selecting suitable net topologies and processing functions that mimic the biological function of the brain. Neural networks are dynamic enough to be used in a wide range of supervised and unsupervised learning models. Today, there are hundreds of different neural network models as well as numerous connecting characteristics and functions. Nevertheless, the principal manner in which neural networks function remains the same.

Figure 5A:
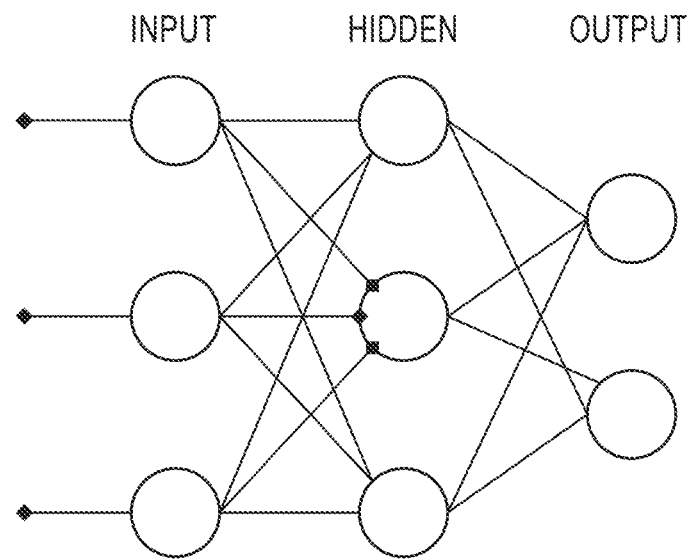
FIG. 5A illustrates a simplified schematic of a canonical neural network as known in the art.
Figure 5B:
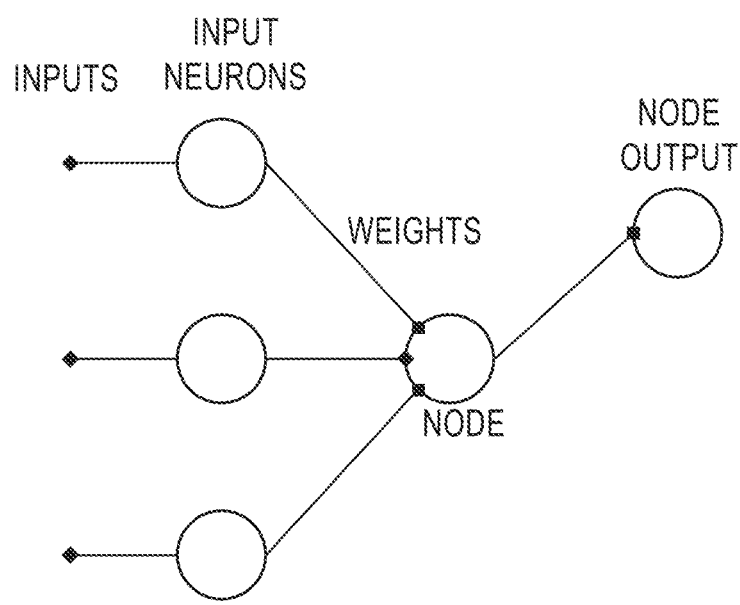
FIG. 5B illustrates an isolated portion of the neural network depicted in FIG. 5A.

For example, FIG. 5A illustrates a simplified schematic of a canonical neural network. FIG. 5B further provides an isolated portion of the neural network depicted in FIG. 5A. As shown, so-called input neurons are located on the input side of the neural network and are connected to hidden neurons. Each neuron has one or several weighted inputs either in the form of external signals or as an output from other neurons. Positive as well as negative weightings are possible. The sum of the weighted inputs is transferred via a transfer function into the output value or values which in turn control other neurons or serve as output values. The hidden neurons shown in FIG. 5A (and as a single node in FIG. 5B) are connected with the output neurons (or an output node in the case of FIG. 5B). Of course, the area of the hidden neurons can also have a considerably more complex structure and be composed of several interlinked levels.

The totality of all neurons of a certain functionality is termed a layer (e.g., an input layer). Some of the more impactful parameters of a neural network, apart from its topology, include the neuron base potentials as well as the strength of the connections between the neurons. In order to set the parameters, a representative training set is iteratively evaluated by the network. After each evaluation cycle the weightings and the base potentials are changed and newly set. This iteration is carried out until the average failure rate falls below a predetermined minimum or a previously defined problem-related termination criterium is reached.

As indicated hereinabove, the imaging system 100 may utilize machine learning to evaluate a focus quality estimate of at least a portion of the sorted connected components (e.g., sorted according to act 204D from FIG. 4). The imaging system 100 may generate inputs for a machine learning model using the identified connected components described above. For example, in some implementations, the system localizes a pixel window about at least some of the connected components of the binary images (e.g., the third set of binary images). The pixel window may take on various sizes, such as 32×32 pixels, or another size. One will appreciate, in view of the present disclosure, that the size of the pixel window may depend on the imaging application for which the imaging system 100 is being employed (e.g., the type of cell being imaged).

The imaging system 100 may also determine a z-stack for each connected component based on the pixel windows for each respective connected component. For example, for a pixel window for a particular connected component identified within a particular binary image associated with a particular z-height (or focus position), the imaging system 100 may identify corresponding pixel windows (e.g., pixel windows with the same pixel coordinates) in other binary images associated with z-heights that are offset from the particular z-height of the particular binary image for the particular connected component (e.g., offset by +1 z-step, −1 z-step, +2 z-step, −2 z-step, etc.), and this collection of pixel windows may form a z-stack for the particular connected component.

One will appreciate, in view of the present disclosure, that the size of the particular z-stack may be varied in different implementations. For example, the z-stack may include a number of pixel windows (from binary images associated with adjacent z-heights) within a range of about 3-11 or more, and the number of pixel windows (similar to the size of the pixel windows) for a z-stack may also depend on imaging application and/or cell type being imaged.

The imaging system 100 may form z-stacks for any number of the connected components. For example, the imaging system 100 may form z-stacks for a predefined number (e.g., 32 or another number) of connected components included in a sorted list of connected components (e.g., sorted as described hereinabove with reference to act 204d of FIG. 4). The imaging system 100 may provide the z-stacks for the various identified connected components as inputs to a machine learning module, and the machine learning module may evaluate a focus quality estimate based on the z-stacks.

Figure 6:
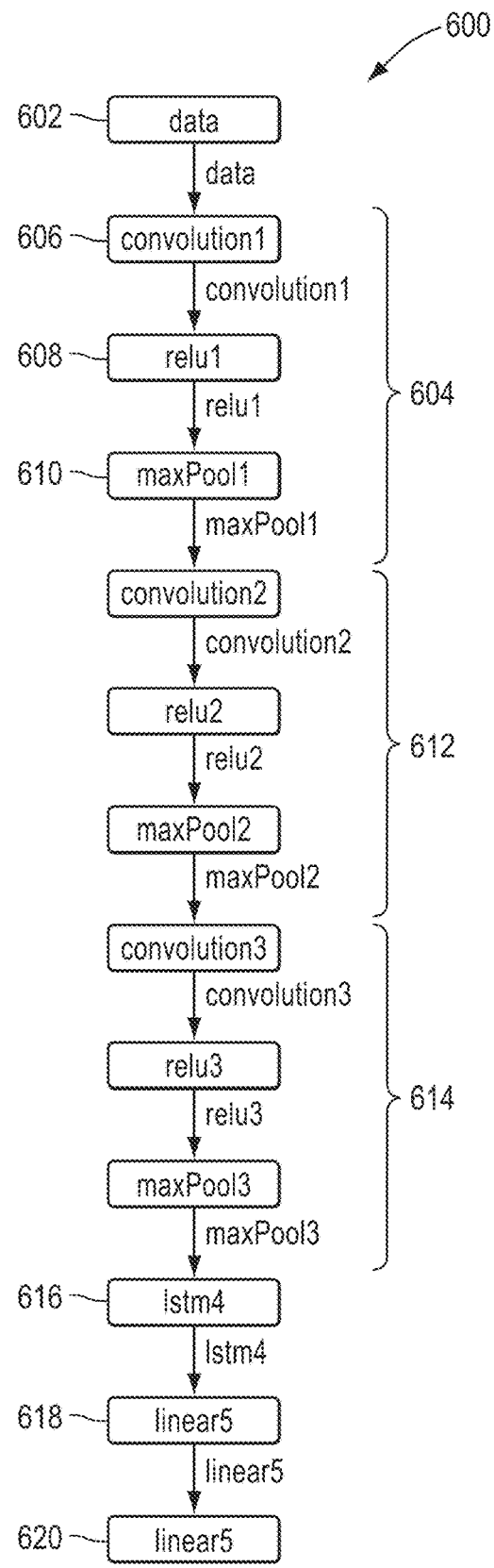
FIG. 6 is a block diagram representing an example design of an artificial neural network for facilitating AI-assisted autofocus, in accordance with one or more embodiments of the present disclosure.

Those skilled in the art will appreciate, in view of the present disclosure, that various machine learning models may be employed to evaluate a focus quality estimate based on one or more sorted connection components (e.g., based on z-stacks, as described above). FIG. 6 illustrates one example neural network that the imaging system 100 can utilize to facilitate focus quality evaluation, in accordance with the present disclosure. In particular, FIG. 6 depicts an example block diagram for an artificial neural network 600 for facilitating AI-assisted autofocus. The artificial neural network 600 may be trained in a supervised or partially supervised manner using training data that includes z-stacks for connected components as input training data and positively identified target focus positions as ground truth output. In some instances, the training data may include z-stacks that include smaller z-steps between the pixel windows or images of the z-stacks to improve the robustness of the artificial neural network 600 for evaluating focus quality.

FIG. 6 illustrates input data 602, which, as indicated above, may comprise any number of z-stacks (e.g., 1, 2, . . . 32, or more). The artificial neural network 600 may receive the input data 602 and process the same using one or more feature identification layers 604. As is shown in FIG. 6, a feature identification layer 604 may comprise various components, such as, for instance, a convolutional layer 606, a linear layer 608, and a max-pooling layer 610 (or, in some instances, an average-pooling layer). By way of non-limiting example, in some implementations, the convolutional layer 606 is a 3×3 convolutional layer, the linear layer 608 is a ReLu nonlinearity function, and the max-pooling layer is a 2×2 max-pooling layer.

FIG. 6 illustrates an implementation in which the artificial neural network 600 includes three substantially identical feature identification layers, in particular feature identification layer 604, feature identification layer 612, and feature identification layer 614. However, in other implementations, the artificial neural network 600 may comprise any number of feature identification layers that have the same or at least partially different components.

FIG. 6 also illustrates an implementation in which the artificial neural network 600 includes a long-short-term-memory (LSTM) process layer 616 that follows the feature identification layers. The LSTM may allow for processing of the z-stacks provided as input in a bi-directional manner. Although implementing an LSTM process layer 616 into the artificial neural network 600 may, in some instances, improve accuracy of the artificial neural network 600 for evaluating focus quality, implementing an LSTM process layer 616 may be process-intensive and/or time-consuming. Thus, in some implementations, an artificial neural network 600 omits the LSTM processing layer 616 to save on compute time and/or resources (e.g., to enable total compute times of less than 20 seconds or of about 10 seconds or less).

FIG. 6 shows that the artificial neural network 600 includes a final linear layer 618 following the LSTM process layer 616 (or, in implementations that omit the LSTM process layer 616, following the feature identification layer 614). The final linear layer 618 may be configured to provide output 620, and the output may comprise a focus quality estimate for each z-height represented in the particular z-stack that was provided as input to the artificial neural network 600. For each particular z-stack provided as input to the artificial neural network 600, the imaging system 100 may identify a particular z-height (or focus position) from the output 620 that represents the target focus position for the particular z-stack.

By providing multiple z-stacks to the artificial neural network 600, the imaging system 100 may obtain corresponding focus quality estimates as output 620 for each z-stack, as well as respective target focus positions for each z-stack. Act 204e associated with act 204 includes calculating a target focus position based on the focus quality estimates of the evaluated connected components. As noted above, the focus quality estimates (from output 620 from the artificial neural network 600) for multiple z-stacks may provide respective target focus positions for each z-stack. The target focus position may be generated or defined based on the focus quality estimates (or respective target focus positions for each z-stack) in various ways. For example, in some instances, the imaging system 100 defines a median, mode, or average of the various respective target focus positions for each z-stack to select an overall target focus position for the cell counting slide that was imaged by the imaging system 100 according to act 204a described hereinabove. In this way, an imaging system 100 may utilize artificial intelligence to facilitate autofocusing in an improved, computationally inexpensive, and/or rapid manner.

Systems and Methods for Facilitating AI-Assisted Cell Viability Counting

Figure 7:
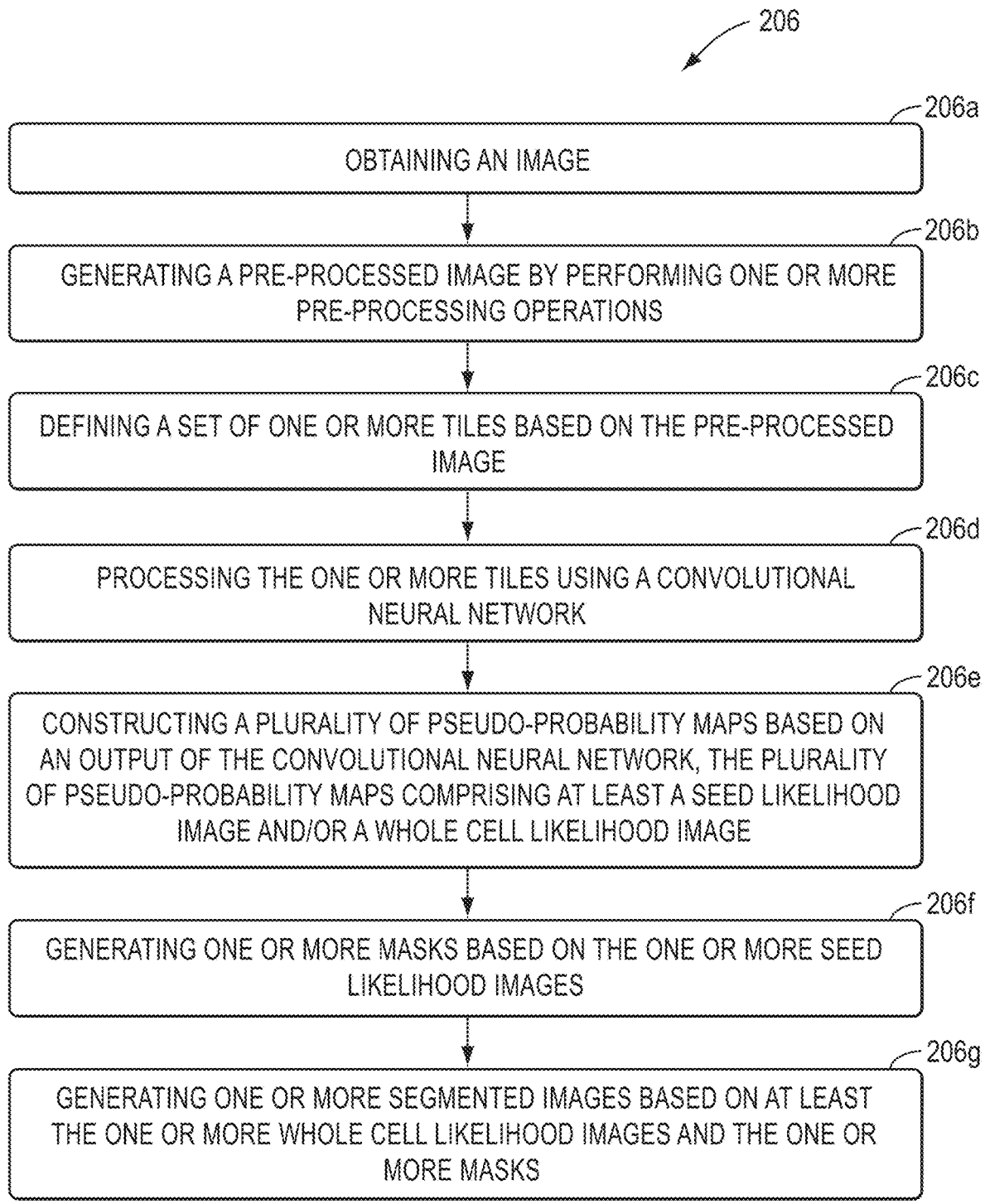
FIG. 7 is an example flow diagram that illustrates various acts for performing automated, AI-assisted cell viability counting using the target focus position, in accordance with one or more embodiments of the present disclosure.

As noted hereinabove, facilitating cell viability counting powered by artificial intelligence may involve performing automated cell viability counting using the target focus position (act 206, as noted hereinabove with reference to FIG. 2). Performing automated cell viability counting using the target focus position can be associated with various acts. FIG. 7 illustrates an example flow diagram depicting various acts associated with act 206 from flow diagram 200 for performing automated cell viability counting using the target focus position.

Although the present disclosure focuses, in at least some respects, performing cell viability counting using a target focus position, one will appreciate, in view of the present disclosure, that the principles discussed herein can be implemented independent of one another. For example, the principles discussed herein related to cell counting may be implemented without necessarily also implementing autofocusing techniques and/or cell viability analysis techniques discussed herein. Similarly, the autofocusing techniques discussed herein may be implemented without necessarily also implementing the cell counting and/or viability analysis techniques discussed herein. For example, a flow cytometer may, in some instances, implement at least some of the cell counting techniques discussed herein, without first performing autofocusing techniques discussed herein. Embodiments of the present disclosure may also periodically utilize the autofocusing techniques discussed herein (e.g., once a day or once a week in a laboratory) while utilizing the cell counting aspects with each sample that is processed, with such embodiments having advantages of saving time and/or being applicable to applications where it may not be possible to autofocus each sample.

Act 206a associated with act 206 includes obtaining an image. In some implementations, act 206 is performed by the imaging system 100 using the processor(s) 112, hardware storage device(s) 114, machine learning module(s) 118, and/or controller 116 of the computer system 110, as well as the image sensor 122, illumination source(s) 124, optical train 126, slide port/stage assembly 106, and/or positioning mechanism of the microscopy system 120.

In some implementations, the image associated with act 206a comprises a monochrome image. By way of example, the imaging system 100 may employ various components of the computer system 110 and the microscopy system 120 to obtain a target focus position in accordance with act 204 (and associated acts 204a-204e) as described hereinabove with reference to FIG. 2 (and FIG. 4). The imaging system 100 may utilize the processor(s) 112 and/or controller 116 to cause the positioning mechanism 128 to position the optical train 126 relative to the slide port/stage assembly 106 in accordance with the target focus position. The imaging system 100 may employ the image sensor 122 and the illumination source(s) 124 in combination with any of the above to capture an image of the cell counting slide using the identified target focus position. In some implementations, the image captured of the cell counting slide at the target focus position is a 2592×1944 monochrome 8-bit image having a pixel size of 0.871 μm. Aside from the foregoing example, an image used for cell counting as described herein may comprise any suitable image size or aspect ratio and may be obtained utilizing any suitable imaging device comprising any suitable pixel size and/or other image sensor characteristics. In some implementations, the image comprises an image size of 96×96, 250×250, or another image size.

Any instructions for performing the acts described herein and/or data used or generated/stored in association with performing the acts described herein (e.g., monochrome images, cell viability count data) may be stored within the hardware storage device(s) 114 in a volatile or non-volatile manner.

As noted above, although the present example focuses on the monochrome image being associated with a target focus position, a monochrome may in other instances, be associated with any focus position in accordance with act 206a.

Act 206b associated with act 206 includes generating a pre-processed image by performing one or more pre-processing operations. The pre-processed image may comprise a pre-processed monochrome image in some instances. Various pre-processing operations are within the scope of the present disclosure. For example, the one or more pre-processing operations of act 206b may comprise one or more of downsampling (or down-averaging), background removal, and/or intensity normalization operations. In some instances, a user is able to select which, if any, pre-processing functions are performed in accordance with act 206b.

In some implementations, the imaging system 100 utilizes processor(s) 112 to perform one or more downsampling operations in accordance with act 206*b*. For example, in some instances, the imaging system 100 performs downsampling via pixel decimation or by applying an averaging filter (e.g., generating each output pixel based on average intensities of its respective neighboring pixels). The imaging system 100 may downsample a captured monochrome image by a predetermined downsampling factor, such as a factor of about 1.5 to about 4, or about 2, in each image dimension (e.g., reducing a 2592×1944 captured image to a 1296×972 downsampled image). Any downsampling factor is within the scope of this disclosure, although, in some instances, a high downsampling factor (e.g., a factor of 4 or greater) may cause some features to be removed from and/or distorted within the pre-processed image that has been downsampled.

As noted above, the one or more pre-processing operations of act 206*b* may comprise a background removal operation. In some instances, an acquired image may have a high or uneven background. Removing the background may facilitate easier distinction of objects of interest within the acquired image. In some instances, background removal is adapted for samples with low or no fluorescence. Thus, as noted above, a user may select whether to perform background removal as part of act 206*b* (e.g., by checking or unchecking a box associated with the performance of background removal).

Figure 8:
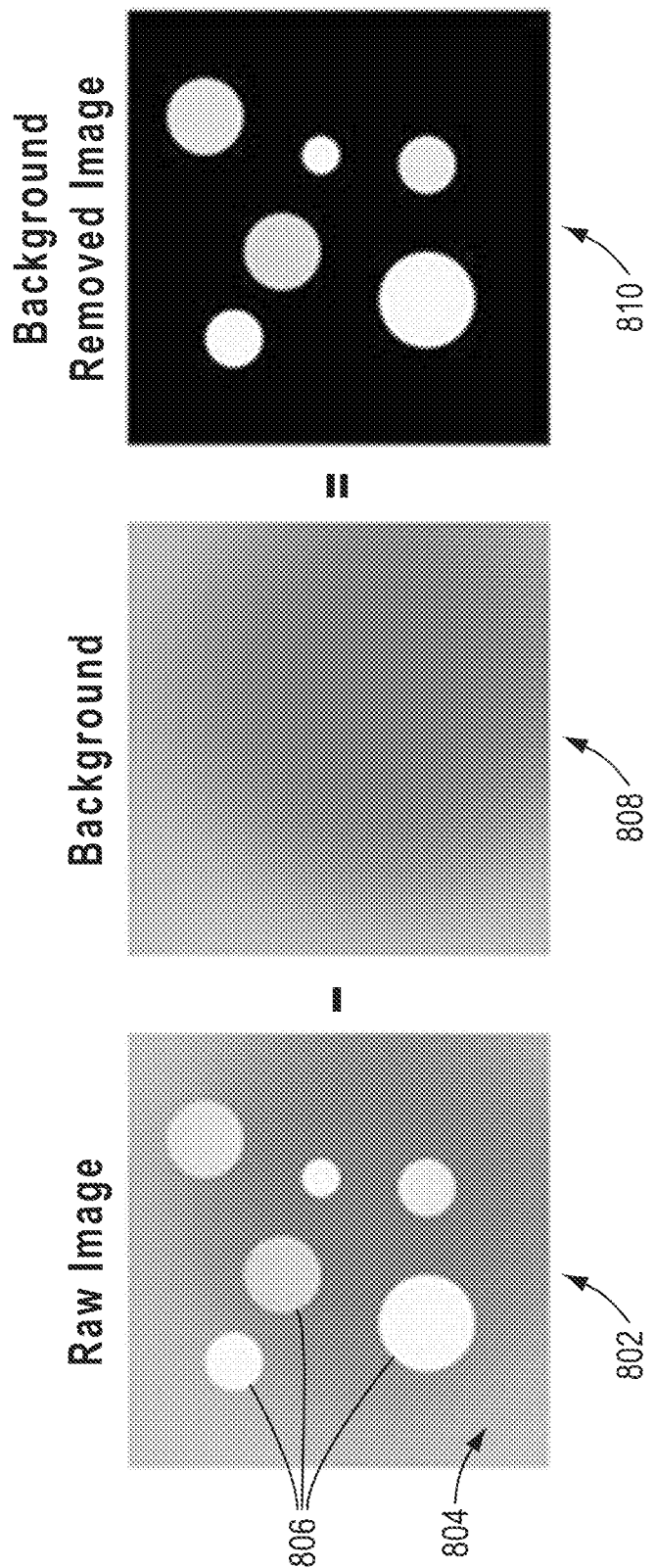
FIG. 8 provides a conceptual representation of background removal.

FIG. 8 provides a conceptual representation of background removal, wherein a raw image 802 includes both a background 804 and objects 806. Background removal may be conceptualized as generating an estimated background 808 and subtracting the estimated background 808 from the raw image 802 to generate a background removed image 810.

Background removal may be facilitated in various ways. For example, background removal may be performed in accordance with low pass filtering methods, such as by estimating a background by calculating the local mean within a radius r at each pixel and subtracting the estimated background from the image. The radius r may be defined as an input maximum object size (e.g., constrained between 1 and 255). The subtraction may result in an average value that is fixed. The low pass filtering background removal may be performed in accordance with a selected object detection mode, such as bright on dark, dark on bright, and/or others. The fixed average value may be 0 for bright on dark modes, a max value for dark on bright modes, and/or a mid-value for other modes.

In some instances, the low pass filtering method is adapted for use in images with channels that are responsible for identifying objects. Low pass filtering methods may perform efficiently in images that have high contrast edges (e.g., crisply stained nuclei). The low pass filter method may also be beneficial for removal of backgrounds attributed to "dirty" samples (e.g., including out-of-plane fluorescence, such as "floater cells"). In some instances, a parameter value for a low pass filter background removal corresponds to the area sampled to determine the amount of background for removal. Lower values may be regarded as more aggressive and may be constrained within the range of the diameter of the largest object(s). Higher values may be regarded as conservative and can be in the range of multiples of the diameter of the largest object(s).

In some instances, background removal may be performed utilizing surface fitting methods, which may comprise splitting an input image into a grid to calculate respective minimum values in each image region and fitting a surface through the respective minimum values. In some instances, utilizing the minimum values (e.g., rather than the average values) preserves true intensity values (but may take longer to calculate).

In some instances, the surface fitting method is adapted for images that require intensity dependent measurements, such as phosphor-specific antibody labeling. The surface fitting method may additional or alternatively be adapted for retaining dim edges of whole cell staining. Similar to the low pass filtering method, a parameter value for a surface fitting background removal may correspond to the area sampled to determine the amount of background for removal, with low values being regarded as aggressive and high values being regarded as conservative.

In some instances, a user interface is provided that allows users to select whether and/or which type of background removal to perform in accordance with act 206*b*.

As noted above, the one or more pre-processing operations of act 206*b* may comprise a normalization operation. The normalization operation may be performed to normalize intensities present in the image pixels (or voxels for 3D images) to reduce the influence of per-object intensity variation on subsequent processes. The normalization operation may comprise a global normalization (e.g., implementing the same image statistics across the entire image) or a kernel-based normalization operation.

Any combination of the foregoing pre-processing operations (e.g., downsampling/down-averaging, background removal, normalization) may be performed in accordance with act 206*b*. Where multiple pre-processing operations are performed, the pre-processing operations may be performed in any suitable order. As noted above, the output of the pre-processing operation(s) is one or more pre-processed (monochrome) images (e.g., a downsampled/down-averaged image, a background removed image, a normalized image, a downsampled/down-averaged and background removed image, a downsampled/down-averaged and normalized image, a background removed and normalized image, a downsampled background removed and normalized image, etc.). The one or more pre-processed images may be utilized for subsequent operations (e.g., act 206*c*, act 206*d*, etc.).

The pre-processing operation(s) may be performed on the monochrome image discussed above with reference to act 206*a*. In some instances, the pre-processing operation(s) is/are performed on the one or more tiles discussed hereinafter with reference to act 206*c* (e.g., via batch processing). One will appreciate, in view of the present disclosure, that at least some pre-processing steps may be implemented into the functionality of the convolutional neural network (CNN) described hereinafter with reference to act 206*d* or may utilize functional architecture that is at least partially independent of the CNN.

In some instances, no pre-processing operations are performed, and the raw data (e.g., the monochrome image of act 206*a*) is directly utilized for subsequent operations (e.g., act 206*c*, act 206*d*, etc.).

Act 206*c* associated with act 206 includes defining a set of one or more tiles based on the pre-processed image (as noted previously, the pre-processed image may comprise a pre-processed monochrome image). Act 206*c* is performed, in some instances, by the imaging system 100 utilizing processor(s) 112. Defining the set of one or more tiles can include various acts, such as reflecting the pre-processed monochrome image to extend its edges by a plurality of pixels (or voxels). Performing a reflection operation on the downsampled image may generate a reflected image with edges extended by 6 pixels, 8 pixels, 16 pixels, or another pixel value. The number of pixels/voxels for extending the downsampled image to obtain the reflected image may be selected based on various factors, such as desired processing time, image size, etc.

The imaging system 100 may then decompose the reflected image into a set of one or more tiles with a predetermined pixel overlap (e.g., a 4, 6, 8, 10, 12, 14, or 16 pixels overlap, or another pixel value overlap as appropriate). In one example, the imaging system 100 decomposes the reflected image into 130 tiles with a pixel size of 128×128 (or another number of tiles of another or the same pixel size).

In some instances, to generate input for a machine learning module for facilitating automated cell counting (e.g., the CNN of act 206d), the imaging system 100 may be configured to store the set of one or more tiles into a tensor array. For example, the set of one or more tiles noted above with reference to act 206c may be stored in a 130×1×128×128 tensor array (or a tensor array with other dimensions, depending on image tile size and number). As will be described hereinbelow, the tensor array may act as input for a machine learning module for performing automated cell counting and/or viability determinations.

Act 206d associated with act 206 includes processing the one or more tiles using a convolutional neural network (CNN). Where the one or more tiles are stored in a tensor array, act 206d may comprise processing the tensor array using the CNN. In some implementations, the imaging system 100 utilizes the processor(s) 112 and/or machine learning module(s) 118 to process the tensor array described hereinabove referring to act 206d. Brief context for artificial intelligence and machine learning is provided hereinabove with reference to act 204d of FIG. 4 and FIGS. 5A and 5B.

Figure 9:
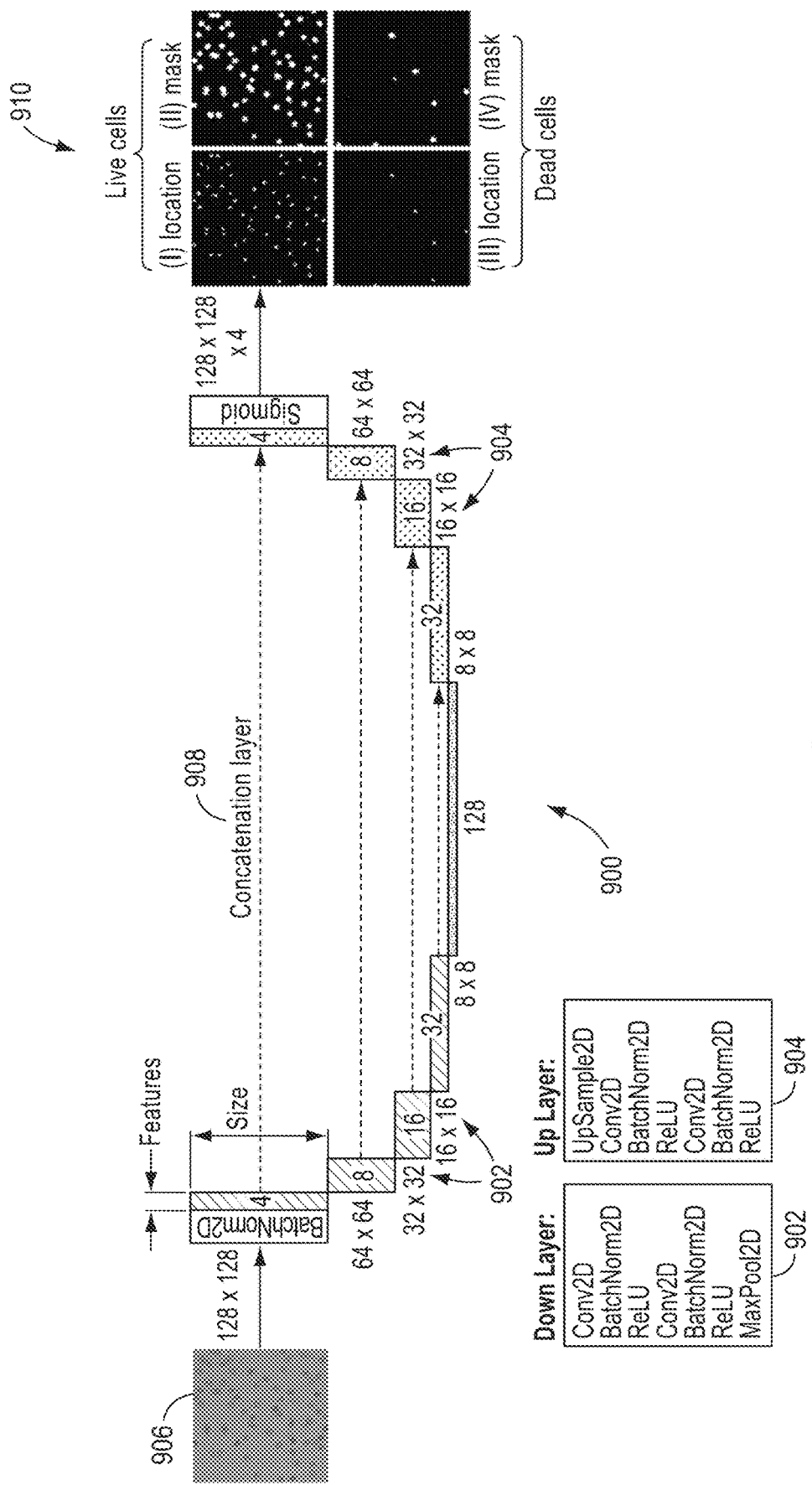
FIG. 9 illustrates a block diagram representing an example design of a U-net convolutional neural network for facilitating AI-assisted determinations of cell viability, in accordance with one or more embodiments of the present disclosure.

Those skilled in the art will appreciate, in view of the present disclosure, that various machine learning models may be employed to process the tensor array in accordance with act 206d. FIG. 9 illustrates one example neural network that the imaging system 100 can utilize to facilitate processing of the one or more tiles as part of performing automated cell counting and/or viability determination. In particular, FIG. 9 illustrates a U-net convolutional neural network 900. FIG. 9 depicts the U-net convolutional neural network 900 receiving a tile 906 of the one or more tiles or tensor array (e.g., from act 206d) as in input, indicating that the U-net convolutional neural network 900 of FIG. 9 depicts neural network processing that is configured to be performed on each tile of the one or more tiles or tensor array. The U-net convolutional neural network 900 may be configured to receive image input, such as rectangular images (e.g., 16-bit images) of varying sizes. For example, image sizes may fall within a range of about 150×150 to about 250×250 in one or both dimensions. One will appreciate that the range may vary for different imaging modalities; for instance, for flow cytometry applications, the input image(s) may be within a range of about 96×96 to about 248×248.

Furthermore, the U-net convolutional neural network 900 may be configured to receive various numbers and/or types of image input. For example, the U-net convolutional neural network 900 may be configured to receive batches of images as concurrent input (e.g., a z-stack or subset of a z-stack of images) and/or batches multiple images of different imaging modalities as concurrent input (e.g., one or more conventional images/volumes and one or more phase contrast images/volumes associated with the same z-position(s)).

The U-net convolutional neural network 900 of FIG. 9 includes a down layer 902 and an up layer 904. FIG. 9 also indicates that the down layer 902 and the up layer 904 can include various components. By way of non-limiting example, FIG. 9 illustrates an implementation in which the down layer 902 includes feature identification layers (e.g., two feature identification layers) that include a convolutional layer (e.g., a 2D convolutional layer), a batch normalization layer (e.g., a 2D batch normalization layer), and a ReLu nonlinearity function layer. FIG. 9 also depicts the down layer 902 as including a max-pooling layer (e.g., a 2D max-pooling layer). The down layer 902 may facilitate downsampling of the input image (e.g., tile 906) in a stepwise fashion (e.g., reducing image size at each step by a factor of 4). In some instances, as shown in FIG. 9, the imaging system 100 may apply a 2D batch normalization prior to applying the components of the down layer 902.

The implementation in FIG. 9 also shows the up layer 904 as including two sets of upsampling layers (e.g., 2D upsampling layers) convolutional layers (e.g., 2D convolutional layers), batch normalization layers (e.g., 2D batch normalization layers), and ReLu nonlinearity function layers. The up layer 904 may facilitate upsampling of the downsampled tile (e.g., downsampled according to the down layer 902) in a stepwise fashion (e.g., increasing image size at each step by a factor of 4), and the imaging system 100 may utilize a concatenation layer 908 to perform the upsampling (e.g., based on corresponding images used or generated during down layer 902 processing). In some instances, as shown in FIG. 9, the imaging system 100 may apply a sigmoid function after applying the components of the up layer 904.

In some instances, the U-net convolutional neural network 900 is trained with a set of training data that includes images from multiple focal planes relative to an identified target focus position (or other focus position(s)). For example, in some implementations, the convolutional neural network 900 is trained on z-heights ranging from −2 to +2 z-steps relative to the identified target focus position to increase a robustness of the convolutional neural network 900 and to reduce sensitivity of the convolutional neural network 900 to autofocus output accuracy (e.g., according to act 204, described hereinabove). The U-net convolutional neural network 900 may be trained in a supervised or partially supervised manner using training data that includes monochrome images (and/or image tiles) as training input and/or manually located and/or identified cell count, live/dead determination, cell segmentation, cell area (e.g., in $\mu m^2$, for individual cells and/or combinations of cells), cell pseudo-diameter (e.g., cell diameter under the assumption that the singlet was perfectly circular, in $\mu m$), whole cell binary masks, seed masks, and/or other information (e.g., tags indicating whether the cell image was processable and/or whether a cell borders a region of interest) as ground truth output. The ground truth may be obtained via human annotation/labeling/tagging/segmenting and/or may at least partially be generated using images captured utilizing an appropriate imaging modality (e.g., brightfield, fluorescence). The training data may comprise images capturing various types of cells, such as IMMUNO-TROL, Macrophage, Jurkat, CAR-T, PBMC, and/or others. The images may be associated with one or more different Z positions. In some instances, the images in the set(s) of training data are pre-processed in accordance with the pre-processing operation(s) that may be performed during end use (e.g., downsampling/down-averaging, background removal, normalization, etc.). The training input can additionally or alternatively include images with debris, allowing the model to differentiate between live/dead cells (including clumps of cells) and debris. In some instances, the training data includes control objects, such as glass beads that are similar in size to live or dead cells (e.g., 1 µm, 2.5 µm, 3.6 µm, 5.5 µm, 9.9 µm, 14.6 µm, 30.03 µm) to enable the U-net convolutional neural network 900 to robustly differentiate between cells and objects that are not cells but share similar physical characteristics (e.g., size and shape) with cells.

As noted previously, the U-net convolutional neural network 900 may be configured to receive various numbers and/or types of image input. Correspondingly, the U-net convolutional neural network 900 may be trained using batches of images as concurrent input (e.g., a z-stack or subset of a z-stack of images) and/or batches multiple images of different imaging modalities as concurrent input (e.g., one or more conventional images/volumes and one or more phase contrast images/volumes associated with the same z-position(s)).

One will appreciate, in view of the present disclosure, that a U-net convolutional neural network 900 (or any other artificial intelligence module(s) discussed herein) may be further trained and/or refined after initial training on the set of training data discussed above. For example, the U-net convolutional neural network 900 may be further trained on training data obtained for particular fields of cell analysis.

As illustrated in FIG. 9, an output of the U-net convolutional neural network 900 can comprise or be used to generate various pseudo-probability maps 910. For instance, FIG. 9 shows the output pseudo-probability maps 910 of the U-net convolutional neural network 900 as including (i) a live cell location probability map indicating center locations for live cells (e.g., a live cell seed likelihood image), (ii) a live cell mask probability map (a live whole cell likelihood image), (iii) a dead cell location probability map indicating center locations for dead cells (a dead cell seed likelihood image), and (iv) a dead cell mask probability map (a dead whole cell likelihood image). For example, the pseudo-probability maps 910 of FIG. 9 represent the predicted/probable locations and shapes/sizes of live and dead cells represented in tile 906 of the tensor array obtained according to act 206*d*.

As noted above, the U-net convolutional neural network 900 may operate on each tile (e.g., tile 906) of the tensor array obtained according to act 206*d*. Accordingly, for the example of a 130×1×128×128 tensor array, the U-net convolutional neural network 900 may generate four pseudo-probability maps for each single tile represented in the tensor array, and these pseudo-probability maps (which are output from the U-net convolutional neural network 900) may become stored in a 130×4×128×128 tensor array.

Although the example presented in FIG. 9 and discussed with reference to act 206*d* includes outputting (or generating based on output) a particular set of pseudo-probability maps via the U-net convolutional neural network 900, other scopes/types of output of a U-net CNN are within the scope of the present disclosure. For example, in some instances, the output of a U-net CNN does not differentiate between live and dead cells and produces a seed likelihood image indicating cell locations and/or a whole cell likelihood image indicating cell shapes/sizes that include(s) information for both live and dead cells (if both are present). For instance, in some implementations, cell counting functionality is implemented independent of cell shape/size/feature detection, such that the U-net CNN outputs at least a seed likelihood image, upon which connected component analysis may be performed to determine cell count (e.g., without also determining cell viability and/or cell shape/size/features). Such functionality may be desirable, by way of non-limiting example, in flow cytometry systems.

Figure 10:
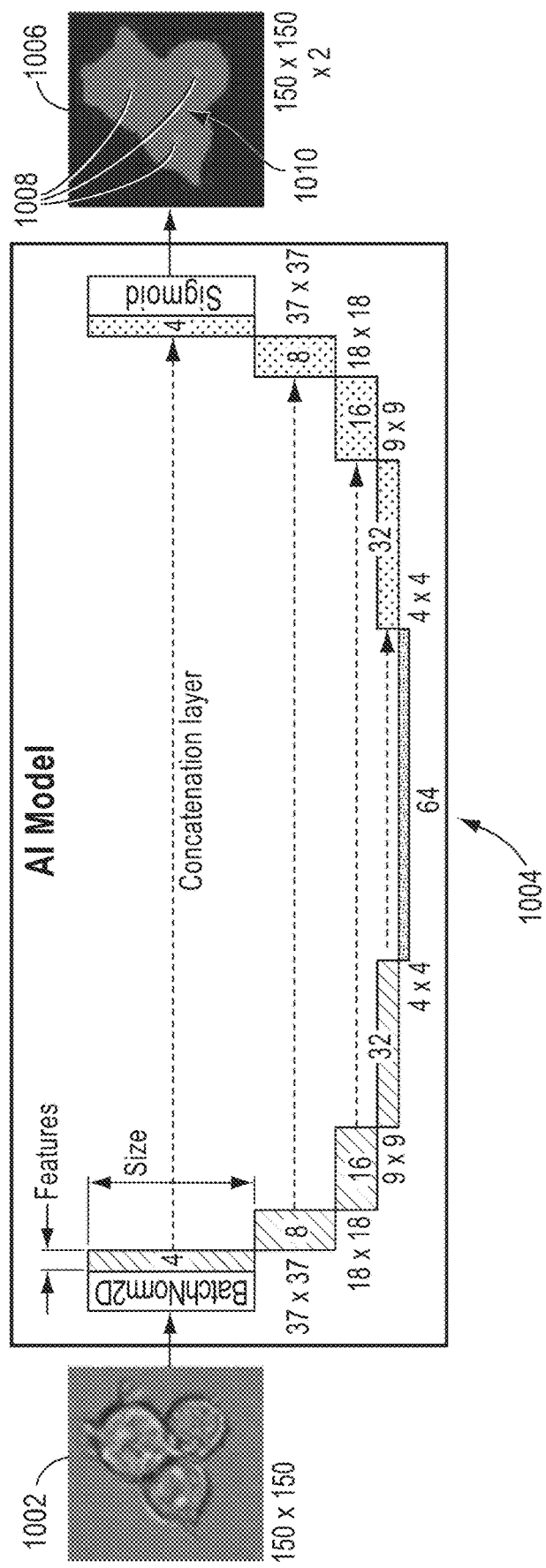
FIG. 10 provides an additional conceptual representation of input and output associated with a U-net convolutional neural network.

An additional conceptual representation of input and output associated with a U-net CNN is provided in FIG. 10. FIG. 10 illustrates an example input image 1002, which may comprise a pre-processed monochrome image or pre-processed monochrome image tile. The input image 1002 is utilized as input to a U-net CNN 1004, which corresponds in principle to the U-net convolutional neural network 900 discussed hereinabove. FIG. 10 also illustrates example output 1006, which comprise a seed likelihood image 1008 and a whole cell likelihood image 1010 overlaid on one another.

Although the present example focuses, in at least some respects, on utilizing a U-net CNN to obtain the pseudo-probability map(s), other modules may be utilized in some embodiments, such as machine learning-driven texture detection and/or kernel detect methods.

Act 206*e* associated with act 206 includes constructing a plurality of pseudo-probability maps based on an output of the convolutional neural network, the plurality of pseudo-probability maps comprising at least a seed likelihood image and/or a whole cell likelihood image. As noted above, in some instances, the output from the U-net convolutional neural network 900 may comprise a 130×4×128×128 tensor array (or otherwise sized tensor array appropriate for the particular inputs used). In some implementations, the imaging system 100 may construct the plurality of pseudo-probability maps of act 206*e* by converting the output of the convolutional neural network (e.g., the 130×4×128×128 tensor array) into an 8-bit format tensor and image stitching the 8-bit format tensor. For example, converting the 130×4×128×128 tensor array into an 8-bit format may comprise multiplying the tensor array by a suitable multiplier, such as 255, and image stitching the 8-bit tensor format may include constructing four full-sized pseudo-probability maps from the tiles of the 8-bit tensor format. In some implementations, the 4 resulting pseudo-probability maps may comprise similar representations as the pseudo-probability maps 910 of FIG. 9 (e.g., live cell location, live cell mask, dead cell location, and dead cell mask), or the output of FIG. 10 (e.g., a seed likelihood image and a whole cell likelihood image).

Act 206*f* associated with act 206 includes generating one or more masks based on the one or more seed likelihood images. For example, in some instances, the imaging system 100 may generate binarized location maps by thresholding 4 full-sized pseudo-probability maps (e.g., corresponding to pseudo-probability maps 910 of FIG. 9). The one or more masks may define or indicate pixel locations for one or more objects (e.g., cells) represented in the one or more seed likelihood images. Thus, in some instances, the one or more masks may be indicative of cell count.

Various techniques for generating the one or more masks are within the scope of this disclosure, such as applying a threshold value of 75% likelihood or greater. In some instances, utilizing a threshold of 192 or greater in pixel intensity is representative of a pseudo-probability of 0.75× 255 or greater). Various threshold values are within the scope of the present disclosure, such as, by way of non-limiting example, threshold values within a range of about 50% to about 90%. Connected-component labeling may be further applied to detect connected regions within the output image(s). The one or more masks may be generated based on the connected-component labels. Additionally, or alternatively, the one or more masks may be generated utilizing a deep learning algorithm.

In some implementations, the imaging system 100 performs additional image processing operations on the binarized location maps, such as dilation processing to attempt to capture potential cells that have been ignored through other processing steps.

Figure 11:
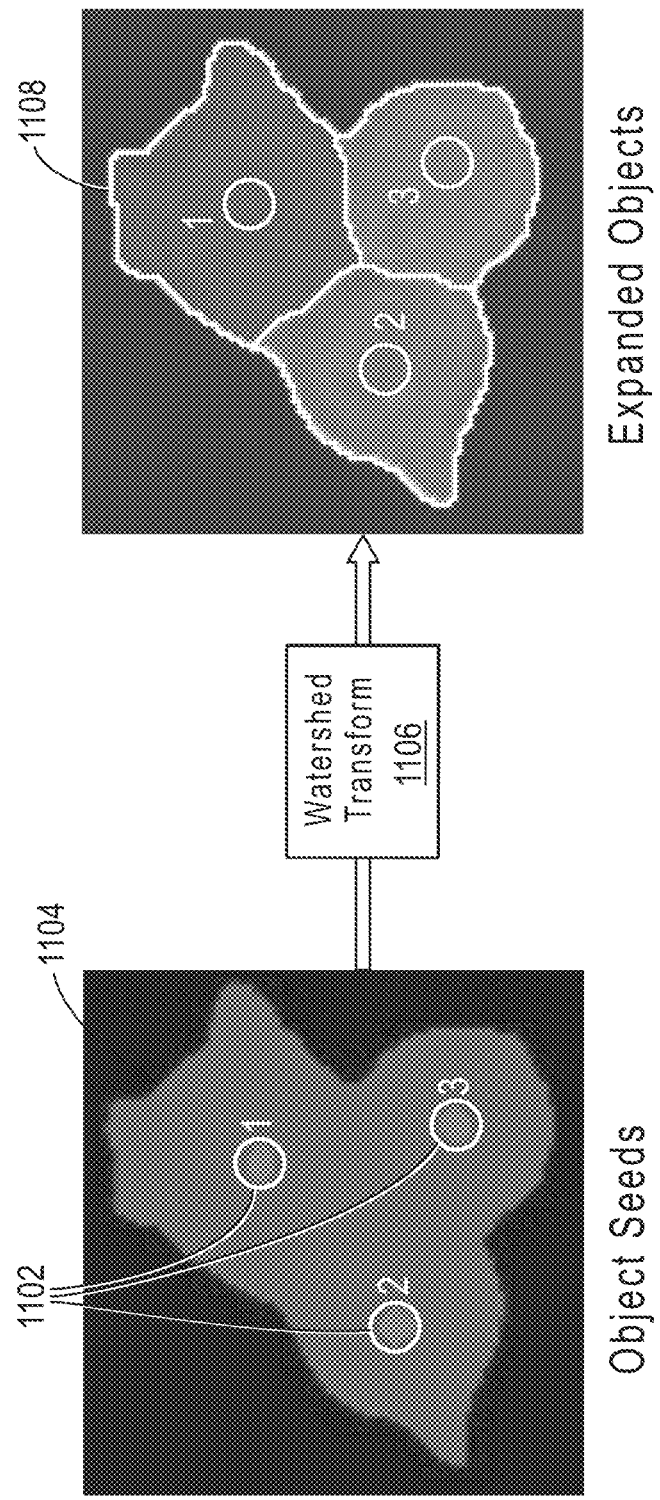
FIG. 11 depicts an example representation of utilizing a watershed transform to generate a segmented image based on a seed likelihood image and a whole cell likelihood image.

Act 206g associated with act 206 includes generating one or more segmented images based on at least the one or more whole cell likelihood images and the one or more masks. The one or more segmented images may indicate/provide cell count and/or cell viability count. In some implementations, the imaging system 100 generates the one or more segmented images via watershed transform applied on a distance map computed from the pixel/voxel locations of the object(s) (e.g., cell(s)) represented in the one or more seed likelihood images. The one or more segmented images may be delimitated by the one or more whole cell likelihood images (e.g., delimited by the respective mask of the object(s)), such that each pixel becomes assigned to an object or background. Binary or intensity-based watershed methods are within the scope of the present disclosure. FIG. 11 depicts an example representation of utilizing watershed transform 1106 to generate a segmented image 1108 based on the seed likelihood image 1102 and the whole cell likelihood image 1104. Different objects represented by the seed likelihood image 1102 are numerically labeled (e.g., "1", "2", "3"). The segmented image 1108 illustrates separate objects (correspondingly labeled "1", "2", and "3" in the segmented image 1108) expanded from the different objects (objects 1, 2, and 3) of the seed likelihood image 1102.

Figure 12:
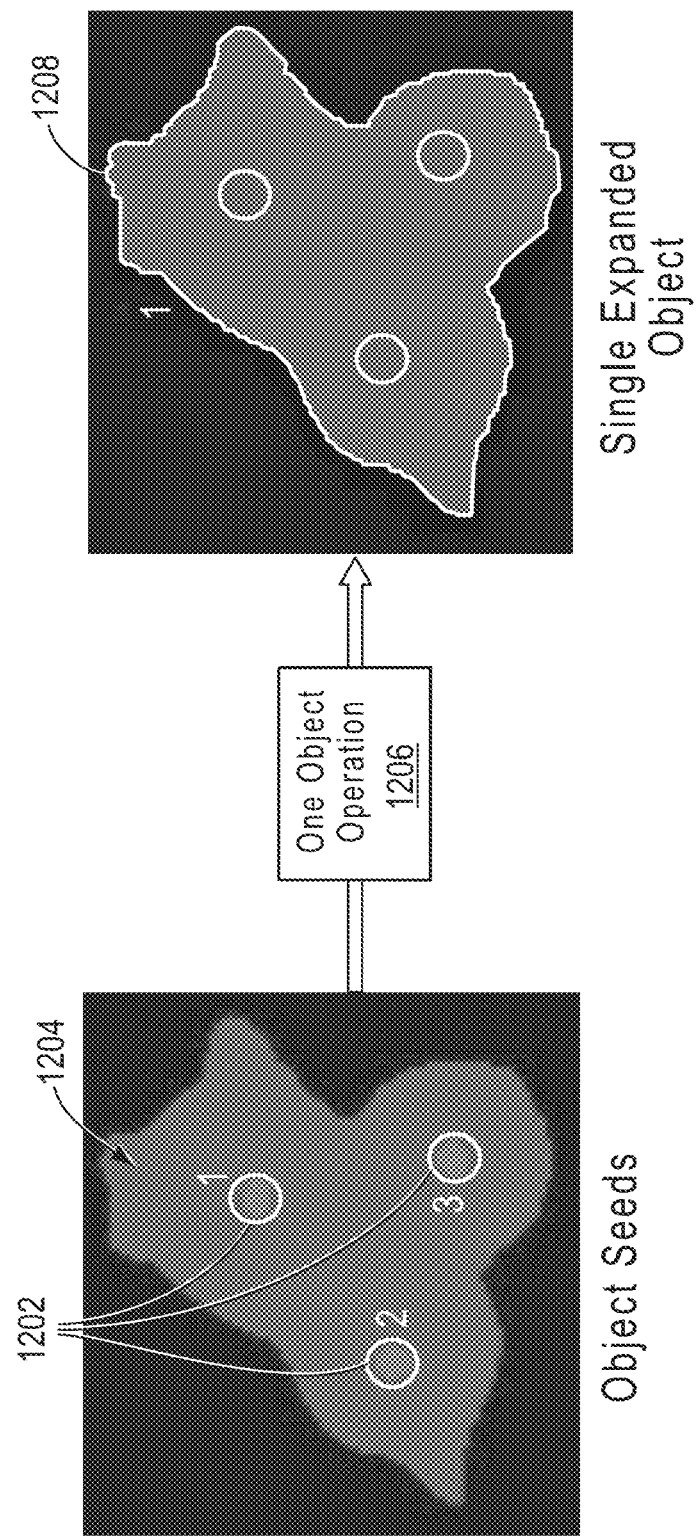
FIG. 12 depicts an example representation of utilizing a one object operation to generate a segmented image based on a seed likelihood image and a whole cell likelihood image.

In addition, or as an alternative, to watershed methods, other techniques may be employed to facilitate generation of one or more segmented images. For example, in some embodiments, one or more segmented images may be generated that treat groupings of cells as a single object, such as by assigning all pixels within the seed likelihood image that are above 75% likelihood to the mask structure (as noted above, other threshold values may be utilized). Such an approach may be regarded as a "one-object" approach and may cause downstream calculations to be performed on the unitary object (rather than on individual objects). Such an approach may be beneficial where computational resources are limited. The cell morphology measurements for the unitary object may be used to validate the number of seeds identified by the seed likelihood image discussed above. FIG. 12 depicts an example representation of utilizing a one object operation 1206 to generate a segmented image 1208 based on the seed likelihood image 1202 and the whole cell likelihood image 1204. Different objects represented by the seed likelihood image 1202 are numerically labeled (e.g., "1", "2", "3"). The segmented image 1208 illustrates the unitary object (labeled "1" in the segmented image 1108) composed from the different objects (objects 1, 2, and 3) of the seed likelihood image 1202.

Figure 13:
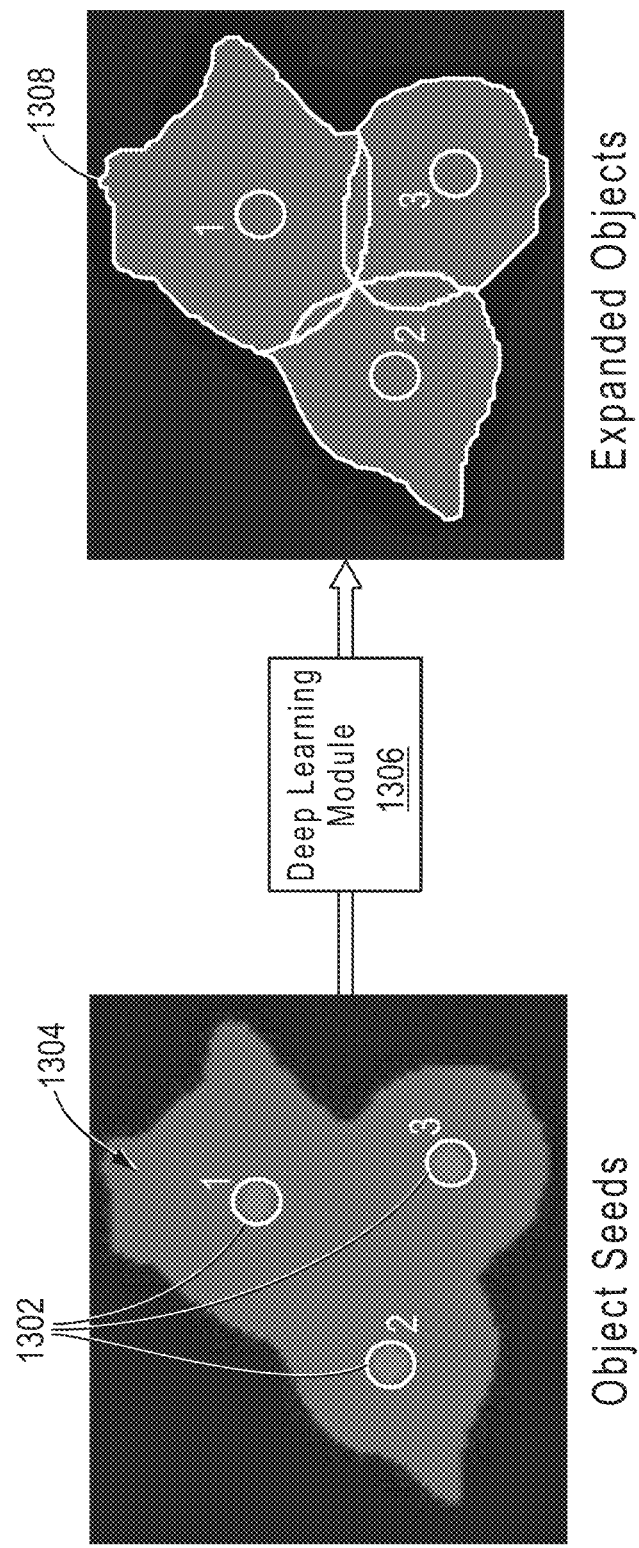
FIG. 13 depicts an example representation of utilizing a deep learning module to generate a segmented image based on a seed likelihood image and a whole cell likelihood image.

As another example, one or more segmented images may be generated utilizing a deep learning module. The deep learning module may be trained utilizing training data comprising seed/whole cell likelihood image input and segmented image ground truth output. In some instances, utilizing a deep learning module may enable accurate segmentation of overlapping cells. FIG. 13 depicts an example representation of utilizing a deep learning module 1306 to generate a segmented image 1308 based on the seed likelihood image 1302 and the whole cell likelihood image 1304. Different objects represented by the seed likelihood image 1302 are numerically labeled (e.g., "1", "2", "3"). The segmented image 1308 illustrates separate objects (correspondingly labeled "1", "2", and "3" in the segmented image 1308) expanded from the different objects (objects 1, 2, and 3) of the seed likelihood image 1302.

The one or more segmented images may, in some instances, indicate or provide a basis for a cell count and/or cell viability count, which may be displayed on a user interface to inform one or more users of the cell count and/or cell viability count represented on the cell counting slide. In some instances, in addition to cell count, one or more feature calculation operations may be performed using the one or more segmented images to determine one or more features of the detected cells. Features may be extracted on a per-cell basis. For example, the imaging system 100 may perform ellipse-fitting on cells represented within the one or more segmented images. The ellipse-fitting on cells of the one or more segmented images may utilize techniques described hereinabove for fitting an ellipse to connected components (e.g., with reference to act 204b from FIG. 4). The ellipses fit to the cells of the one or more segmented images may facilitate acquisition of advantageous data related to the cells imaged on the cell counting slide, such as providing measurements of object size (e.g., in μm), providing histograms of object size, providing pixel intensity, providing a basis for calculating object circularity, and/or others. Additional examples of features that may be obtained for detected cells include object number, object center (e.g., per-dimension object center, such as an x-center, a y-center, a z-center, etc.), object width (e.g., width of minimum bounding box containing object), object height (e.g., height of minimum bounding box containing object), pixel size (e.g., per-dimension pixel size, such as x-pixel size, y-pixel size, z-pixel size, etc.), area, perimeter, perimeter-to-area, fiber length (e.g., length of an object measured along its spine), fiber width (e.g., width of an object estimated from area and length), centroid (e.g., x-centroid, y-centroid), orientation (e.g., orientation in degrees of object-aligned bounding box), coherency (e.g., measure of the alignment of the substructures within an object), major radius, minor radius, gyration radius (e.g., along the z-axis), box length (e.g., length of object-aligned bounding box), box width (e.g., width of object-aligned bounding box), length-to-width ratio, box fill ratio, number of pixels comprising each object, object intensity (e.g., maximum intensity, minimum intensity, total intensity, average intensity, standard deviation of intensity, skewness of intensity, kurtosis of intensity, entropy of intensity, etc.), radial intensity moments (e.g., average radial intensity, standard deviation of radial intensity, skewness of radial intensity, kurtosis of radial intensity, radial distance, etc.), object co-occurrence (e.g., maximum probability, contrast, entropy, or angular second moment of 2D co-occurrence of intensity distribution of all pixels within the mask), object size (e.g., diameter of circle with area equal to area of object), equivalent sphere metrics (e.g., diameter, surface area, or volume of equivalent circle or sphere), moments for equivalent ellipse (e.g., ratio of length to width of equivalent ellipse, volume of ellipsoid generated by rotating area-equivalent ellipse about major axis or about minor axis, etc.), object distances (e.g., distance from an object to its nearest neighboring object, average distance from an object to all other objects, standard deviation of distance from an object to all other objects, etc.), object gradient ratio (e.g., intensity gradient of inner region or outer region within object mask, ratio of intensity gradient between inner and outer region within object mask), surface area density (e.g., total difference of intensity of all pixels within object normalized by its area), and/or others. Any of the foregoing features may be weighted in an appropriate manner (e.g., according to pixel intensity). Such data may be obtained for live and/or dead cells represented in the cell counting slide and can, in some instances be stored in a consumer report and prepared/provided for export (e.g., using communications module(s) 108).

Furthermore, as noted hereinabove with reference to FIG. 2, the ellipses fit to the one or more segmented images may enable the system to display a representation of cell viability count (e.g., according to act 208 of flow diagram 200 of FIG. 2).

Figure 14:
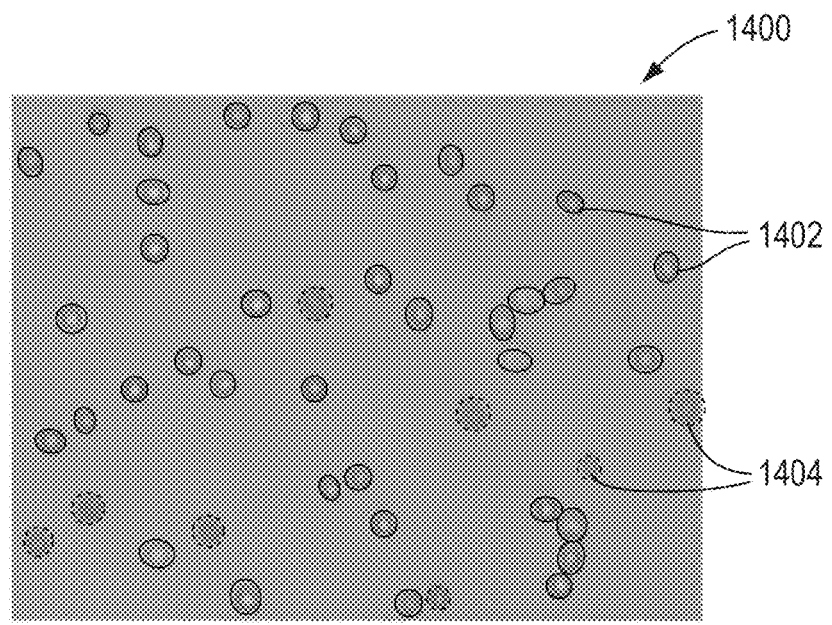
FIG. 14 illustrates an example image displayed after implementing methods for AI-assisted autofocus and automated cell viability count, in accordance with one or more embodiments of the present disclosure.

For example, referring now to FIG. 14, illustrated is an image representing an example result following processing by the disclosed AI-assisted autofocus and automated cell viability count system. The locations and masks of the live/dead cells obtained as output from processing individual tiles through the artificial neural network (e.g., the U-net convolutional neural network illustrated in FIG. 9) were used to generate pseudo probability maps, and after a series of image processing and ellipse-fitting steps discussed above, the resulting ellipse map includes solid line ellipse markers for live cells 1402 and dashed line ellipse markers for dead cells 1404 and overlain onto a corresponding brightfield image 1400 to clearly identify the live and dead cells. In some embodiments, live and dead cells are visually differentiated in one or more images that can be viewed on the display associated with the imaging system (e.g., display 104 of imaging system 100 in FIG. 1). For example, live cells may be outlined, shaded, and/or otherwise emphasized with a particular color (e.g., green), whereas dead cells may be outlined, shaded, and/or otherwise emphasized with a different color (e.g., red).

Because disclosed systems and methods are able to take advantage of information in the z-stack that is not readily apparent from a single z-stack slice (e.g., the polarity reversal phenomena), disclosed systems are beneficially able to autofocus on a mixture of live and dead cells using minimal processing cycles and without needing additional processing hardware. This improved method of autofocusing allows for the rapid and reliable identification of the target focus position in any given sample and is a useful first step for enabling disclosed methods of automated cell viability counting. Similar to the autofocus methods discussed above, disclosed methods of automated cell counting and/or cell viability counting disclosed herein are a meaningful improvement over competing prior art systems and methods.

Figures 15A, 15B, 15C:
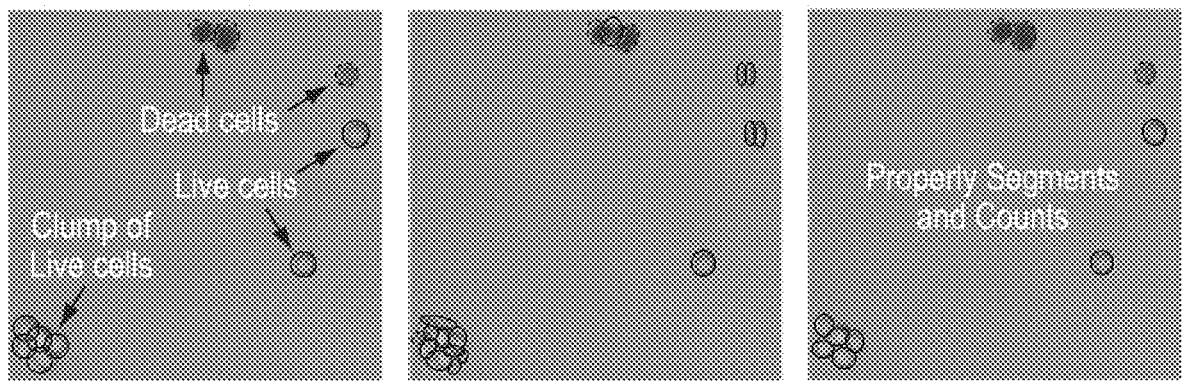
FIGS. 15A-15C illustrate the same base images having been evaluated and annotated with a number and position of live and dead cells within the respective images, as determined by a biologist (FIG. 15A), a prior art automated cell identification and viability method (FIG. 15B), and an AI-assisted autofocus and automated cell count method disclosed herein (FIG. 15C).

For example, as shown in FIGS. 15A-15C, the same base images have been evaluated and annotated with a number and position of live and dead cells within the respective images. The images shown in FIG. 15A were evaluated by an experienced biologist who annotated the number and position of live and dead cells. The images in FIG. 15A were determined to be accurately and precisely annotated and served as a positive control for comparisons of accuracy and precision between a prior art method of automated cell identification and viability and an example AI-assisted autofocus and automated cell viability count method, as disclosed herein.

As shown in FIG. 15B, which illustrates images that were evaluated and annotated with the number and positions of live and dead cells by a prior art automated cell identification and viability method, the prior art methods fail to precisely segment and identify the number of cells within a cellular cluster, fail to consistently identify monodispersed cells as single cells, fail to accurately differentiate live/dead cells, and fail to ignore debris, instead identifying portions of debris within the viewing area as a collection of clustered and monodispersed live/dead cells.

In contrast to the prior art methods (e.g., as exemplified in FIG. 15B), the systems and methods disclosed herein for AI-assisted autofocus and automated cell viability count properly segment and count the number of live/dead cells (compared to biologist annotated controls) and additionally avoid debris—as shown in FIG. 15C. As exemplified in FIGS. 15A-15C (and repeatedly shown between 12 different cell types—data not shown), the disclosed solutions showed a significant improvement in cell segmentation and discrimination against debris, as well as in accuracy of the viability count, over prior image processing methods. Such improvements have been repeatedly shown to occur across monodispersed and aggregated cellular specimens.

Example Data Structure Details

The following discussion provides example data structures that may be associated with various components/elements disclosed herein. An image may be defined by an image class, which may contain an array of pixel values and accompanying metadata. The pixel values may take on various forms, such as Byte, SByte, UInt16, Int16, Int32, UInt32, Int64, UInt64, Single, Double, etc. The metadata may comprise, by way of non-limiting example, pixel data type, bits per pixel, bytes per pixel, pixel offset, stride (e.g., allowing regions of an image to be cut out without doing a copy of the pixels), XYZ location within well (e.g., in micrometers), XYZ pixel size, image dimensions (width, height), acquisition time, intensity-controlled settings (e.g., exposure time, gain, binning), and/or others. The image class may support grayscale and/or color (RGB). If color is used, then each pixel may comprise corresponding color values (e.g., RGB color values, or values in accordance with another color system). The image class may be serializable and/or convertible into different types (e.g., between color and RGB). Image readers may be utilized to read/write image class from standard file formats via any stream (file, memory, pipe).

A mask may define a list of pixel indexes and/or the bounding box which the pixels belong to. The mask class may be used as input (e.g., for defining truth data) and output (e.g., for defining location of objects). The bounding box may be minimum bounding box that contains the object, thereby allowing the mask definition to be kept independent of the field from which it is acquired. Thus, in some implementations, the mask may be extracted from one image set (e.g., one timepoint, one pass) and applied to a second image set (e.g., another timepoint, another pass), even where the second image set is not associated with the exact same position as the first (e.g., the second image set may be associated with a different magnification and/or XYZ position). The mask class may provide methods to convert the pixel list between bounding box definitions. In some instances, the image may be alternately adjusted to match the mask (e.g., instead of adjusting the mask to match the image). For example, the image class may provide a method to "cut out" the bounding box to match the mask (e.g., the cutout may only change the pixel offset and stride without actually copying the image pixel values). Extension methods may be utilized to convert from mask class to shapes (e.g., ellipsis, rectangles, polygons) and/or vice versa. In some instances, transforming a mask to a shape may be lossy (e.g., "best-fit"), but may still provide a convenient way to display the mask.

Output data may comprise various data types, such as double, integer, Boolean, datetime, double enumeration, integer enumeration, string enumeration, string, binary, a 1D, 2D, or N-D array of any of the foregoing, etc.

Computer Systems of the Present Disclosure

It will be appreciated that computer systems are increasingly taking a wide variety of forms. In this description and in the claims, the term "computer system" or "computing system" is defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein, is intended to include the portion of the disclosed imaging systems that is in electrical communication with optical and mechanical components associated therewith and that are operable to perform the various autofocus and/or cell viability counting methods disclosed herein. As such, the term "computer system" or "computing system," as used herein, can execute operational commands related to stage/sample movement in addition to controlling automated image capture and processing (e.g., determining a target focus position and/or performing automated cell viability counting). It should be appreciated that unless otherwise specifically stated, the computing systems disclosed herein are component parts of the disclosed imaging systems.

The memory component of disclosed computer systems may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing systems disclosed herein are understood to have stored thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, and so forth. Examples of input mechanisms might include, for instance, microphones, touchscreens, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RANI, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RANI and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. As provided above, however, the computing systems of the present disclosure are preferably component parts of the disclosed imaging systems. Thus, while the computing systems may be capable of or otherwise include communication channels that enable network communications (e.g., for file and/or data transfer, configuring or updating the firmware and/or software associated with the computing system), it should be appreciated that the computing systems disclosed herein are intended to practice the disclosed methods locally instead of in distributed system environments linked through a network (either by hardwired data links, wireless data links, or by a combination of hardwired and wireless data links) where the processing and/or memory may be distributed between various networked computing systems.

Although the subject matter described herein is provided in language specific to structural features and/or methodological acts, it is to be understood that the subject matter defined in the appended claims is not necessarily limited to the described features or acts so described. Rather, the described features and acts are disclosed as example forms of implementing the claims.

Additional Terms & Definitions

Unless defined otherwise, all technical and scientific terms used herein have the same meaning as commonly understood by one of ordinary skill in the art to which the present disclosure pertains. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present invention has been specifically disclosed in part by preferred embodiments, example embodiments, and optional features, modification and variation of the concepts herein disclosed may be resorted to by those skilled in the art, and such modifications and variations are considered to be within the scope of this disclosure. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments and are to be considered within the scope of this disclosure.

Moreover, unless a feature is described as requiring another feature in combination therewith, any feature herein may be combined with any other feature of a same or different embodiment disclosed herein. Furthermore, various well-known aspects of illustrative systems, methods, apparatuses, and the like are not described herein in particular detail in order to avoid obscuring aspects of the example embodiments. Such aspects are, however, also contemplated herein.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resorting to undue experimentation. All art-known functional equivalents of methods, devices, device elements, materials, procedures, and techniques specifically described herein are intended to be encompassed within this disclosure.

When a group of components or similar is disclosed herein, it is understood that all individual members of the disclosed group and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice preferred and/or alternative embodiments of the disclosure, unless otherwise stated. Whenever a range is given in the specification, all intermediate ranges and subranges, as well as all individual values included in the ranges given are intended to be included in the disclosure.

All changes that come within the meaning and range of equivalency of the claims are to be embraced within their scope.

What is claimed is:

1. A method of performing automated cell viability counting, comprising:
    capturing an image at a target focus position;
    spatially downsampling the captured image by downsampling the captured image by a factor of 2 via pixel decimation to form a downsampled image, optionally as a 1296×972 image;
    decomposing the downsampled image into a plurality of tiles;
    storing the plurality of tiles in a tensor array;
    processing the tensor array using a convolutional neural network;
    wherein the convolutional neural network is trained with images from multiple focal planes relative to the focus position, preferably ranging from −2 to +2 z-position;
    constructing a plurality of pseudo-probability maps based on an output of the convolutional neural network;

thresholding the plurality of pseudo-probability maps to generate binarized location maps and binarized mask maps;

generating a segmented downsampled image by segmenting the downsampled image using the binarized location maps for seeding and the binarized mask maps for delimitating cell areas, wherein the segmented downsampled image indicates/provides a cell viability count; and displaying a representation of the cell viability count.

2. The method of claim 1, wherein decomposing the downsampled image into a plurality of tiles comprises:

reflecting the downsampled image to extend its edges by a plurality of pixels, forming a reflected image; and decomposing the reflected image into the plurality of tiles with pixel overlap.

3. The method of claim 2, wherein reflecting the downsampled image extends its edges by 4-12 pixels, or 6-10 pixels, or about 8 pixels.

4. The method of claim 2, wherein the reflected image is decomposed into 80-190 tiles, or 90-180 tiles, or 100-170 tiles, or 110-160 tiles, or 120-150 tiles, or about 130 tiles, optionally with size of 128×128 pixels with pixel overlap.

5. The method of claim 1, wherein the convolutional neural network comprises a U-net convolutional neural network.

6. The method of claim 1, wherein the output of the convolutional neural network is stored in a 130×4×128×128 tensor array.

7. The method of claim 1, wherein constructing the plurality of pseudo-probability maps comprises converting the output of the convolutional neural network into an 8-bit format tensor and image stitching the 8-bit format tensor.

8. The method of claim 7, wherein converting the output into the 8-bit format tensor comprises multiplying the 130×4×128×128 tensor array by a multiplier, optionally wherein the multiplier is about 255.

9. The method of claim 7, wherein image stitching the 8-bit format tensor comprises constructing 4 full size pseudo-probability maps from the tensor array.

10. The method of claim 9, wherein the output of the convolutional neural network comprises pseudo-probability maps associated with (i) a location of live cells, (ii) a mask of live cells, (iii) a location of dead cells, and (iv) a mask of dead cells.

11. The method of claim 1, wherein thresholding comprises applying a threshold value greater than 50% to 90% pseudoprobability, or about 75% pseudoprobability.

12. The method of claim 1, wherein the downsampled image is segmented by watershed transform applied on a distance map computed from respective locations of live/dead cells and delimitated by the respective mask of live/dead cells.

13. The method of claim 1, further comprising ellipse fitting cells within the segmented downsampled image.

14. The method of claim 13, wherein ellipse fitting comprises identifying one or more objects in the image.

15. The method of claim 14, wherein ellipse fitting comprises measuring object size, constructing a histogram of object size, pixel intensity, and calculating object circularity.

16. A computer system configured to perform automated cell viability counting, comprising one or more processors and one or more hardware storage devices having stored thereon computer-executable instructions that when executed by the one or more processors configure the computer system to perform the method of claim 1.

* * * * *